(12) United States Patent
Padhye et al.

(10) Patent No.: US 10,703,048 B2
(45) Date of Patent: Jul. 7, 2020

(54) PLASTICITY INDUCED BONDING

(71) Applicant: Massachusetts Institute of Technology, Cambridge, MA (US)

(72) Inventors: Nikhil Padhye, Sunnyvale, CA (US); David Moore Parks, Pembroke, MA (US); Bernhardt Levy Trout, Lexington, MA (US); Alexander H. Slocum, Bow, NH (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/230,403

(22) Filed: Dec. 21, 2018

(65) Prior Publication Data

US 2019/0134916 A1 May 9, 2019

Related U.S. Application Data

(62) Division of application No. 15/312,446, filed as application No. PCT/US2015/031666 on May 20, 2015, now Pat. No. 10,213,960.

(Continued)

(51) Int. Cl.
*B29C 65/02* (2006.01)
*B32B 37/06* (2006.01)
(Continued)

(52) U.S. Cl.
CPC ............ *B29C 65/02* (2013.01); *B29C 65/006* (2013.01); *B29C 65/1432* (2013.01);
(Continued)

(58) Field of Classification Search
CPC ...... B29C 66/71; B29C 65/004; B29C 65/006; B29C 65/02; B29C 65/1432; B29C 65/72; B29C 65/8215; B29C 65/8223; B29C 65/8253; B29C 66/1122; B29C 66/341; B29C 66/43; B29C 66/45; B29C 66/723; B29C 66/73117; B29C 66/73121; B29C 66/73151; B29C 66/73161;
(Continued)

(56) References Cited

U.S. PATENT DOCUMENTS 168,240 A 9/1875 Dunton
705,691 A 7/1902 Morton
(Continued)

FOREIGN PATENT DOCUMENTS

EP 0651997 A1 * 5/1995 ............ A61K 9/0056
EP 0 651 997 B1 10/1998
(Continued)

OTHER PUBLICATIONS

Invitation to Pay Additional Fees dated Jul. 21, 2015 for Application No. PCT/US2015/031666.
(Continued)

*Primary Examiner* — Sonya M Sengupta
(74) *Attorney, Agent, or Firm* — Wolf, Greenfield & Sacks, P.C.

(57) ABSTRACT

Methods and apparatuses for bonding polymeric parts are disclosed. Specifically, in one embodiment, the polymeric parts are bonded by plastically deforming them against each other while they are below the glass transition temperatures.

13 Claims, 15 Drawing Sheets

Related U.S. Application Data

(60) Provisional application No. 62/014,608, filed on Jun. 19, 2014, provisional application No. 62/000,594, filed on May 20, 2014.

(51) Int. Cl.

| | | |
|---|---|---|
| *B32B 37/10* | (2006.01) | |
| *C09J 5/00* | (2006.01) | |
| *B29C 65/14* | (2006.01) | |
| *B29C 65/72* | (2006.01) | |
| *B29C 65/82* | (2006.01) | |
| *B29C 65/00* | (2006.01) | |
| *G05G 15/08* | (2006.01) | |
| *B32B 37/00* | (2006.01) | |
| *B29K 105/00* | (2006.01) | |

(52) U.S. Cl.
CPC .......... *B29C 65/72* (2013.01); *B29C 65/8215* (2013.01); *B29C 65/8223* (2013.01); *B29C 66/1122* (2013.01); *B29C 66/341* (2013.01); *B29C 66/43* (2013.01); *B29C 66/45* (2013.01); *B29C 66/73117* (2013.01); *B29C 66/73921* (2013.01); *B29C 66/83221* (2013.01); *B29C 66/83411* (2013.01); *B29C 66/83413* (2013.01); *B29C 66/91945* (2013.01); *B29C 66/92* (2013.01); *B29C 66/9221* (2013.01); *B29C 66/9261* (2013.01); *B32B 37/06* (2013.01); *B32B 37/10* (2013.01); *C09J 5/00* (2013.01); *G05G 15/08* (2013.01); *B29C 66/71* (2013.01); *B29C 66/723* (2013.01); *B29C 66/73121* (2013.01); *B29C 66/73151* (2013.01); *B29C 66/73772* (2013.01); *B29C 66/73774* (2013.01); *B29C 66/81* (2013.01); *B29C 66/8161* (2013.01); *B29K 2105/0038* (2013.01); *B32B 2037/0092* (2013.01); *B32B 2309/02* (2013.01); *C09J 2400/226* (2013.01)

(58) Field of Classification Search
CPC ........ B29C 66/73772; B29C 66/73774; B29C 66/73921; B29C 66/8161; B29C 66/8223; B29C 66/8827; B29C 66/83221; B29C 66/83411; B29C 66/83413; B29C 66/91945; B29C 66/9221; B29C 66/9261; B29C 66/92; B29K 2001/00; B29K 2023/06; B29K 2023/18; B29K 2025/06; B29K 2031/04; B29K 2033/12; B29K 2039/06; B29K 2069/00; B29K 2083/00; B29K 2105/0038; B32B 2037/0092; B32B 2309/02; B32B 37/06; B32B 37/10; C09J 2400/226; C09J 5/00; G05G 15/08
USPC .................. 156/358, 553, 580, 582
See application file for complete search history.

(56) References Cited

U.S. PATENT DOCUMENTS

| | | | |
|---|---|---|---|
| 2,373,634 A | 4/1945 | Wagner | |
| 2,836,291 A | 5/1958 | Stroop | |
| 3,007,848 A | 11/1961 | Stroop | |
| 3,625,214 A | 12/1971 | Higuchi | |
| 3,917,251 A | 11/1975 | De Lise et al. | |
| 3,917,255 A | 11/1975 | Watrous | |
| 4,029,757 A | 6/1977 | Mlodozeniec et al. | |
| 4,029,758 A | 6/1977 | Mlodozeniec et al. | |
| 4,031,200 A | 6/1977 | Reif | |
| 4,069,084 A | 1/1978 | Mlodozeniec et al. | |
| 4,069,086 A | 1/1978 | Reif | |
| 4,072,551 A | 2/1978 | Dabal et al. | |
| 4,083,741 A | 4/1978 | Goldberg | |
| 4,126,502 A | 11/1978 | Dabal et al. | |
| 4,126,503 A | 11/1978 | Gardner | |
| 4,128,444 A | 12/1978 | Mlodozeniec | |
| 4,128,445 A | 12/1978 | Sturzenegger et al. | |
| 4,165,998 A | 8/1979 | Adams et al. | |
| 4,197,289 A | 4/1980 | Lipinsky et al. | |
| 4,228,149 A | 10/1980 | Brewer et al. | |
| 4,307,555 A | 12/1981 | Mlodozeniec et al. | |
| 4,308,250 A | 12/1981 | Griffin et al. | |
| 4,322,449 A | 3/1982 | Voss et al. | |
| 4,332,789 A | 6/1982 | Mlodozeniec | |
| 4,349,531 A | 9/1982 | Mlodozeniec et al. | |
| 4,416,719 A * | 11/1983 | Horiuchi ................. B32B 37/06 |
| | | | 156/359 |
| RE31,764 E | 12/1984 | Voss et al. | |
| 5,208,098 A | 5/1993 | Stover | |
| 5,338,611 A | 8/1994 | Lause et al. | |
| 5,522,954 A * | 6/1996 | Bennett ............... B29C 65/1412 |
| | | | 156/272.2 |
| 5,685,935 A | 11/1997 | Heyer et al. | |
| 5,948,430 A | 9/1999 | Zerbe et al. | |
| 6,177,096 B1 | 1/2001 | Zerbe et al. | |
| 6,270,599 B1 * | 8/2001 | Wood ..................... B29C 35/10 |
| | | | 156/272.2 |
| 6,284,264 B1 | 9/2001 | Zerbe et al. | |
| 6,287,595 B1 | 9/2001 | Loewy et al. | |
| 6,303,143 B1 | 10/2001 | Chrai et al. | |
| 6,306,428 B1 | 10/2001 | Lehmann et al. | |
| 6,449,925 B1 | 8/2002 | Otsu et al. | |
| 6,482,895 B2 | 11/2002 | Maugans et al. | |
| 6,552,024 B1 | 4/2003 | Chen et al. | |
| 6,592,887 B2 | 7/2003 | Zerbe et al. | |
| 6,655,112 B1 | 12/2003 | Cremer et al. | |
| 6,702,894 B2 | 3/2004 | Lee et al. | |
| 6,709,671 B2 | 3/2004 | Zerbe et al. | |
| 6,783,768 B1 | 8/2004 | Brown et al. | |
| 7,008,668 B2 | 3/2006 | Hogan et al. | |
| 7,070,656 B2 | 7/2006 | Hogan et al. | |
| 7,083,805 B2 | 8/2006 | Begleiter | |
| 7,153,538 B2 | 12/2006 | Brown et al. | |
| 7,285,303 B2 | 10/2007 | Martin | |
| 7,357,891 B2 | 4/2008 | Yang et al. | |
| 7,425,292 B2 | 9/2008 | Yang et al. | |
| 7,470,397 B2 | 12/2008 | Meathrel et al. | |
| 7,666,337 B2 | 2/2010 | Yang et al. | |
| 7,727,466 B2 | 6/2010 | Meathrel et al. | |
| 7,732,020 B2 | 6/2010 | King et al. | |
| 7,824,588 B2 | 11/2010 | Yang et al. | |
| RE42,126 E | 2/2011 | Ye et al. | |
| 7,897,080 B2 | 3/2011 | Yang et al. | |
| 7,910,031 B2 | 3/2011 | Yang et al. | |
| 7,910,641 B2 | 3/2011 | Myers | |
| 7,972,618 B2 | 7/2011 | Fuisz et al. | |
| 8,017,150 B2 | 9/2011 | Yang et al. | |
| 8,084,059 B2 | 12/2011 | Edgren et al. | |
| 8,388,994 B1 | 3/2013 | Scheer et al. | |
| 9,205,089 B2 | 12/2015 | Trout et al. | |
| 10,213,960 B2 | 2/2019 | Padhye et al. | |
| 2002/0032220 A1 | 3/2002 | Al-Ghazawi et al. | |
| 2002/0068092 A1 | 6/2002 | Bosch et al. | |
| 2004/0228919 A1 | 11/2004 | Houghton et al. | |
| 2005/0158362 A1 | 7/2005 | Wheatley et al. | |
| 2005/0180992 A1 | 8/2005 | Belcher et al. | |
| 2006/0013869 A1 | 1/2006 | Ignatious et al. | |
| 2006/0273279 A1 | 12/2006 | Kaplan et al. | |
| 2008/0026040 A1 | 1/2008 | Farr et al. | |
| 2008/0075772 A1 | 3/2008 | Solomon et al. | |
| 2008/0241216 A1 | 10/2008 | Von Falkenhausen et al. | |
| 2009/0061496 A1 | 3/2009 | Kuhn et al. | |
| 2010/0119583 A1 | 5/2010 | Rosenberg et al. | |
| 2010/0203342 A1 | 8/2010 | Xie et al. | |
| 2010/0297406 A1 | 11/2010 | Schaffer et al. | |
| 2011/0129510 A1 | 6/2011 | Liebmann et al. | |
| 2011/0136669 A1 | 6/2011 | Liebmann et al. | |
| 2011/0220205 A1 | 9/2011 | Jang et al. | |
| 2011/0300626 A1 | 12/2011 | Arinzeh | |
| 2012/0305174 A1 | 12/2012 | Trout et al. | |
| 2012/0309250 A1 | 12/2012 | Velev et al. | |

(56) References Cited

U.S. PATENT DOCUMENTS

| | | | |
|---|---|---|---|
| 2013/0295143 A1 | 11/2013 | Trout et al. | |
| 2017/0080637 A1 | 3/2017 | Padhye et al. | |
| 2018/0050528 A1* | 2/2018 | Jing | B32B 37/10 |

FOREIGN PATENT DOCUMENTS

| | | | | |
|---|---|---|---|---|
| EP | 1 088 787 A1 | 4/2001 | | |
| EP | 1088787 A1 * | 4/2001 | | C01B 13/324 |
| EP | 1 671 612 A2 | 6/2006 | | |
| EP | 1671612 A2 * | 6/2006 | | A61J 3/00 |
| EP | 1 920 768 A1 | 5/2008 | | |
| EP | 1920768 A1 * | 5/2008 | | A61K 9/2072 |
| JP | 57046843 A * | 3/1982 | | B29C 65/46 |
| WO | WO 80/001984 A1 | 10/1980 | | |
| WO | WO-8001984 A1 * | 10/1980 | | A61K 9/0034 |
| WO | WO 2005/000264 A1 | 1/2005 | | |
| WO | WO-2005000264 A1 * | 1/2005 | | B29C 41/085 |
| WO | WO 2008/056001 A1 | 5/2008 | | |
| WO | WO-2008056001 A1 * | 5/2008 | | A61K 9/2072 |
| WO | WO 2010/002418 A2 | 1/2010 | | |
| WO | WO-2010002418 A2 * | 1/2010 | | A61K 9/0056 |

OTHER PUBLICATIONS

International Search Report and Written Opinion for PCT/US2015/031666 dated Sep. 30, 2015.
International Preliminary Report on Patentability for PCT/US2015/031666 dated Dec. 1, 2016.
International Search Report and Written Opinion for Application No. PCT/US2012/035464 dated Sep. 7, 2012.
International Preliminary Report on Patentability for Application No. PCT/US2012/035464 dated Nov. 7, 2013.
Boiko, Is adhesion between amorphous polymers sensitive to the bulk glass transition? Colloid Polym Sci. Sep. 2013; 291(9):2259-62.
Boiko et al, Chain scission upon fracture of autoadhesive joints formed from glassy poly (phenylene oxide). J Adhesion. 2014;90:596-606.
Boiko et al., Strength development at the interface of amorphous polymers and their miscible blends, below the glass transition temperature. Macromolecules. 1998;31(19):6620-6. Epub Aug. 25, 1998.
Brochard-Wyart et al., Hindered interdiffusion in asymmetric polymer-polymer junctions. Macromolecular Symposia. 1990;40(1):166-77.
Brown, The adhesion between polymers. Annual Review of Materials Science. Aug. 1991. 21(1):463-489. Doi: 10.1146/annurev.ms.21.080191.002335.
Brown, Mix-mode effects on the toughness of polymer interfaces. J Mater Sci. 1990;25(6):2791-4.
Brown, A molecular interpretation of the toughness of glassy polymers. Macromolecules. 1991;24(10):2752-6.
Cardell, Study of polymeric film bonding for pharmaceutical applications. Thesis paper. Massachusetts Institute of Technology. Cambridge, Massachusetts. Jun. 2011. 29 pages.
Chen et al., Electrospun magnetic fibrillar polystyrene nanocomposites reinforced with nickel nanoparticles. Macromol Chem Phys. 2010;211:1775-83.
Cho et al., Consolidation and self-bonding in poly (ether ether ketone)(PEEK). J Appl Polym Sci. 1995;56(11):1435-54.
Cho et al.. Effect of a block copolymer on the adhesion between incompatible polymers. I. Symmetric tests. J Polym Sci Part B: Polym Phys. 1990;28(10):1699-1718.
De Gennes, The formation of polymer/polymer junctions. Tribology Series, 7:355-367,1981.
Dong et al., Encapsulation of multiple biological compounds within a single electrospun fiber. Small. Jul. 2009;5(13):1508-12.
Forward et al., Free surface electrospinning from a wire electrode. IOP Institute of Physics. Apr. 10-14, 2011. Bangor University, Wales. UK. Abstract presented at Electrostatics 2011. 1 page.
Forward et al., Free surface electrospinning.. IOP Institute of Physics. Electrostatic 2011 meeting presentation. Apr. 10-14, 2011. Bangor University, Wales. UK.. 22 pages.
Green et al., Matrix effects on the diffusion of long polymer chains. Macromolecules. 1986;19(4):1108-14.
Jud et al., Fracture mechanics studies of crack healing and welding of polymers. Journal of Materials Science. Jan. 1, 1981. 16(1):204-210. DOI: 10.1007/BF00552073.
Jud et al., Load transfer through chain molecules after interpenetration at interfaces. Polymer Bulletin. 1979. 1(10):697-707. DOI: 10.1007/BF00255445.
Kausch et al., Polymer interdiffusion. Annual Review of Materials Science. Aug. 19, 1989: 341-77. DOI: 10.1146/annurev.ms.19.080189.002013.
Kim, Layer bonding of Solvent-Cast Thin Films for Pharmaceutical Solid Dosage Forms. Thesis. Massachusetts Institute of Technology. Master of Science in Mechanical Engineering. September Thesis submitted Sep. 2010. Published Jun. 2, 2011. 1-84.
Klein, The interdiffusion of polymers. Science. Nov. 2, 1990;250(4981):640-6.
Kline et al., Polymer welding relations investigated by a lap shear joint method. Polymer Engineering & Science. Jan. 1998. 28(1):52-57. DOI: 10.1002/pen.760280109.
Kunz et al., Initial stages of interdiffusion of PMMA across an interface. Macromolecules. Mar. 25, 1996. 29(7): 2548-54.
Lee et al., Adhesion of high polymers. i. influence of diffusion, adsorption, and physical state on polymer adhesion. Journal of Polymer Science Part A-2: Polymer Physics. Jul. 5, 1967;4(7):751-60. DOI: 10.1002/pol.1967.160050410. Epub Mar. 10, 2003.
Lee et al., Direct measurement of molecular mobility in actively deformed polymer glasses. Science. Jan. 9, 2009;323(5911):231-4. doi: 10.1126/science.1165995. Epub Nov. 27, 2008.
Lukas et al., Self-organization of jets in electrospinning from a free liquid surface: A generalized approach. Journal of Applied Physics. 2008;103:084309(1-7). Epub Apr. 25, 2008. doi: 10.1063/1.2907967.
Michielsen et al., Review of thermally point-bonded nonwovens: Materials, processes, and properties. J Appl Polym Sci. 2006;99(5):2489-96. Epub Dec. 16, 2005.
Nagy et al., Comparison of electrospun and extruded soluplus-based solid dosage forms of improvised dissolution. Journal of Pharmaceutical Sciences. Jan. 2012;101(1):322-32.
Prager et al., The healing process at polymer-polymer interfaces. The Journal of Chemical Physics. Nov. 15, 1981. 75(10):5194-8. DOI:10.1063/1.441871.
Rabinowicz, Friction and Wear of Materials, Second Edition, Adhesions, 1995, p. 280.
Revalor et al., Electrospraying active pharmaceutical ingredients. Abstract presented at ISIC 18. 18$^{th}$ International Symposium on Industrial Crystallization. Sep. 13-16, 2011. Zurich, Switzerland. 4 pages.
Roy et al., Thermal bonding of microfluidic devices: Factors that affect interfacial strength of similar and dissimilar cyclic olefin copolymers. Sensor Actuat. B-Chem. 2012;161:1067-73. Epub Dec. 16, 2011.
Schaber et al., Economic analysis of integrated continuous and batch pharmaceutical manufacturing: a case study. Industrial & Engineering Chemistry Research. Jul. 27, 2011. 50(17):10083-92. DOI: 10.1021/ie2006752.
Scholten et al., Electrospray as a tool for drug micro- and nanoparticle patterning. Langmuir. Jun. 7, 2011;27(11):6683-8. doi: 10.1021/la201065n. Epub May 6, 2011.
Sun et al., Preparations, properties and applications of chitosan based nanofibers fabricated by electrospinning. Express Polymer Letters. 2011;5(4):342-61.
Sung, Effect of bonding temperature on the joint strength of polyolefin/butyl rubber and polyolefin/ethylene-vinylacetate copolymer. Polym Eng & Sci. Aug. 1979;19(11):810-4.
Tsui et al., Enhanced bonding of polypropylene to polypropylene and other materials with novel thermoplastic heat-activated adhesives. http://www.temp.speautomotive.com/SPEA_CD/SPEA2002/pdf/f04.pdf, 2002, 7 pages.

(56) References Cited

OTHER PUBLICATIONS

Voyutskii et al., The role of diffusion phenomena in polymer-to-polymer adhesion. Journal of Applied Polymer Science. 1963. 7(2):475-491. DOI: 10.1002/app.1963.070070207. Epub Mar. 9, 2003.
Wang et al., A novel controlled release drug delivery system for multiple drugs based on electrospun nanofibers containing nanoparticles. Journal of Pharmaceutical Sciences. May 3, 2010;99(12):4805-11.
Wang et al., A novel method for preparing electrospun fibers with nano-/micro-scale porous structures. Polym Bull. Apr. 2009;63:259-65.
Wang et al., Effect of tethering chemistry of cationic surfactants on clay exfoliation, electrospinning and diameter of PMMA/clay nanocomposite fibers. Polymer 51. 2010:6295-302.
Wang et al., Magnolol entrapped ultra-fine fibrous mats electrospun from poly(ethylene glycol)-b-poly(l-lactide) and in vitro release. Chinese Journal of Polymer Science. Jan. 2011;29(2):173-9.
Wang et al., Production and Characterization of Monodisperse, Carbamazepine Nanocrystals by an Electrospray Technique. Novartis-MIT Center for Continuous Manufacturing and Department of Chemical Engineering. Massachusetts Institute of Technology. Abstract. Submitted May 1, 2011.
Whitlow et al., Diffusion of polymers at interfaces: A secondary ion mass spectroscopy study. Macromolecules. 1991;24(22):5926-38.
Willet et al., Strength of incompatible amorphous polymer interfaces. Macromolecules. 1993;26(20):5336-49.
Wool et al., A theory crack healing in polymers. Journal of Applied Physics. Oct. 1, 1981. 52(10): 5953-5963. DOI: 10.1063/1.328526.
Xiao et al., Immobilization of zerovalent iron nanoparticles into electrospun polymer nanofibers: Synthesis, characterization, and potential environmental applications. J Phys Chem C. 2009;113(42):18062-8.

\* cited by examiner $$\text{Nominal Strain } (e^p) = \left|\frac{t_2 - t_1}{t_1}\right|$$

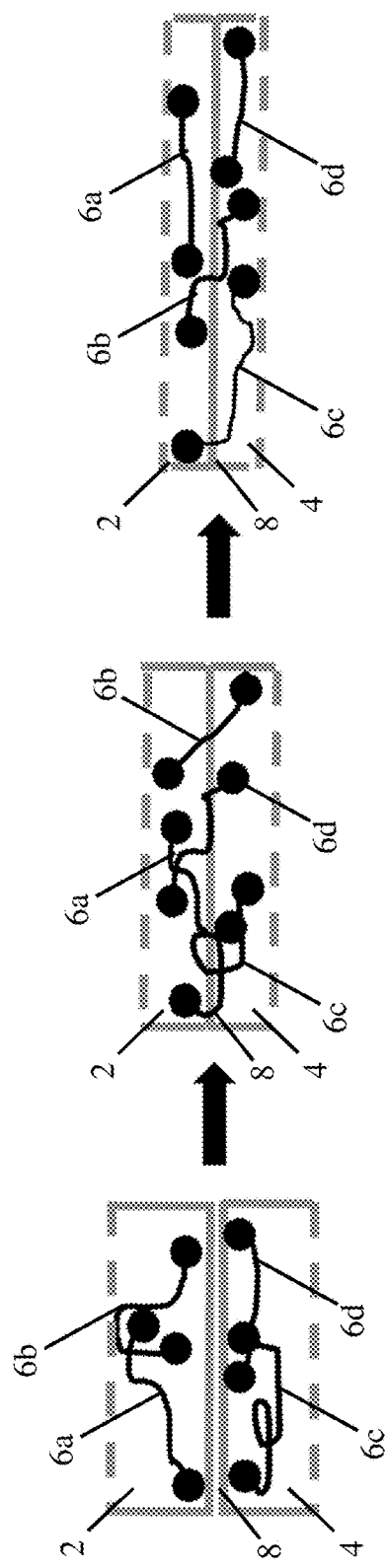
Fig. 25
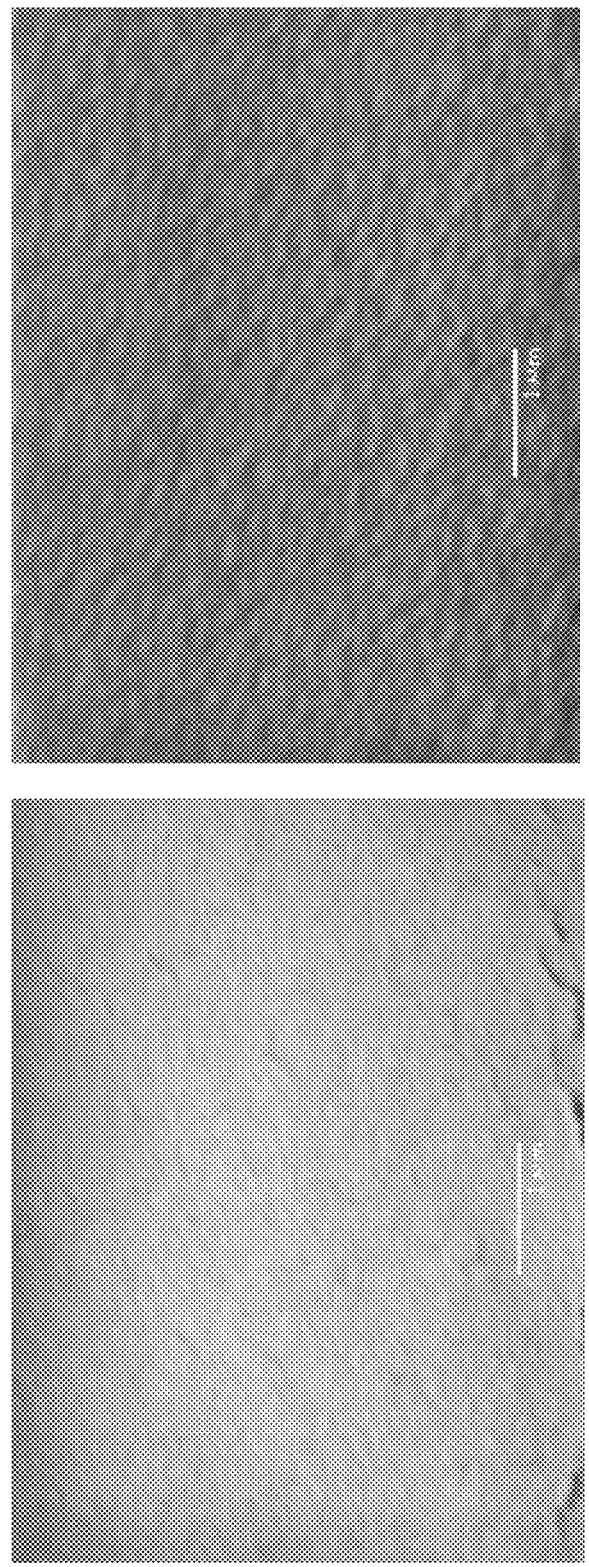
Fig. 26A
Fig. 26B

PLASTICITY INDUCED BONDING

RELATED APPLICATIONS

This application is a divisional of U.S. patent application Ser. No. 15/312,446, filed Nov. 18, 2016, which is a national stage filing under 35 U.S.C. 371 of International Patent Application No. PCT/US2015/031666, filed on May 20, 2015 which claims the benefit of U.S. Provisional Patent Application No. 62/000,594 filed on May 20, 2014 and U.S. Provisional Patent Application No. 62/014,608 filed on Jun. 19, 2014, each of which are incorporated herein by reference in their entirety.

FIELD

Disclosed embodiments are related to plasticity induced bonding.

BACKGROUND

There are many methods used for bonding two polymeric parts together. For example, adhesives, surface modifications, direct heating, and/or or temperature related methods such as dielectric-heating, ultrasound, laser, or micro-wave based heating might be used to bond the polymeric parts. More specifically, heat-related polymer adhesion methods have been practiced for decades. During such processes, when two polymeric parts are brought into contact with each other at a temperature above their respective glass transition temperatures and held under low to moderate pressures, the polymer chains from the two sides inter-diffuse to establish entanglements across the interface and thereby causing bonding. As a result of this inter-penetration and entanglement, cracks optically disappear during healing and strong bonds are developed between the two surfaces after welding.

SUMMARY

In one embodiment, a method includes: placing a first polymeric part in contact with a second polymeric part; and plastically deforming the first polymeric part and the second polymeric part against each other to bond the first polymeric part to the second polymeric part. Additionally, during the plastic deformation, a temperature of the first polymeric part is less than a glass transition temperature of the first polymeric part and a temperature of the second polymeric part is less than a glass transition temperature of the second polymeric part.

In another embodiment, a method includes: placing a first polymeric part in contact with a second polymeric part; applying a compressive stress between the first polymeric part and the second polymeric part. The applied compressive stress causes plastic deformation in both the first polymeric part and the second polymeric part, and the compressive stress is applied for a sufficient period of time to form a bond between the first polymeric part and the second polymeric part. During this process, the applied compressive stress is greater than a yield strength of the first polymeric part and a yield strength of the second polymeric part, and the compressive stress is less than an ultimate compressive strength of the first polymeric part and an ultimate compressive strength of the second polymeric part. Additionally, while the compressive stress is applied, a temperature of the first polymeric part is less than a glass transition temperature of the first polymeric part and a temperature of the second polymeric part is less than a glass transition temperature of the second polymeric part.

In yet another embodiment, an apparatus includes a pressing element constructed and arranged to apply a compressive force to a first part in contact with a second part. The apparatus also includes a controller in electrical communication with the pressing element. The controller controls the pressing element to apply a compressive stress to the first part and the second part that is greater than a yield strength and less than an ultimate compressive strength of both the first part and the second part. Additionally, the controller controls the pressing element to plastically deform the first part and the second part to a compressive strain between about 1% and a compressive strain limit of both the first part and the second part.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various nonlimiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 25 is a schematic representation of polymer chains within two adjacent parts with increasing amounts of plastic strain applied;

FIG. 26A is a scanning electron micrograph of a surface morphology of a film prior to plasticity induced bonding; and FIG. 26B is a scanning electron micrograph of a fracture surface morphology of a film after plasticity induced bonding and de-bonding;

DETAILED DESCRIPTION

Figure 1A:
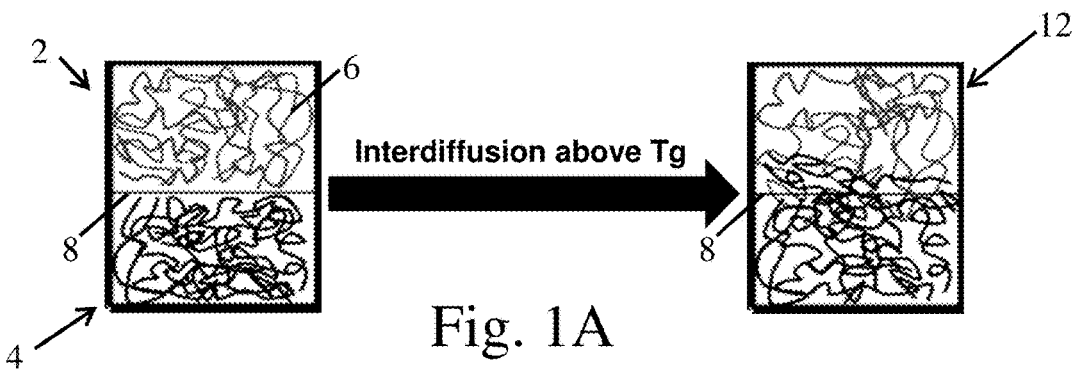
FIG. 1A is a schematic representation of polymer adhesion using a typical heat treatment.

The inventors have recognized that it may be desirable to develop bonding methods and apparatuses that reduce, and/ or eliminate, the application of high temperatures, long healing times, adhesives, and or surface modifications used during typical polymer bonding processes. Additionally, the inventors have recognized that it may be desirable to provide methods and apparatuses for continuously manufacturing bonded polymeric films and parts. For example, a continuous bonding method might be used to form thin polymeric films used in drug products while possibly: minimizing the generated waste; reducing the use of energy and raw materials; providing quality checks in line; and/or improving reliability, consistency, and/or flexibility of a bonding process.

In view of the above, the inventors have recognized the benefits associated with bonding polymers below their glass transition temperature thus reducing, and/or substantially eliminating, the need to provide heat energy to form a bond. More specifically, the inventors have recognized that polymers subjected to plastic deformation below their glass transition temperatures results in enhanced-molecular-mobility of polymer chains within the polymer-matrix that may cause polymer chain-entanglement across an interface between two adjacent polymeric parts. This polymer chain entanglement across the interface results in a bond between the two polymeric parts. Additionally, it is possible such a bonding method may also result in reduced bonding times on the order of seconds to minutes as compared to typical heat treatment based bonding methods.

In one embodiment, bonding of two or more polymeric parts includes placing a first polymeric part in contact with a second polymeric part along an interface. The first and second polymeric parts are then plastically deformed against each other along their interface. This plastic deformation includes at least the regions of the first and second polymeric parts adjacent to the interface. This plastic deformation results in bonding of the first polymeric part the second polymeric part. Without wishing to be bound by theory, it is believed that polymeric chains become entangled across the interface due to increased polymer chain mobility during the deformation. In addition to the above, the temperature of the first and second polymeric part may be maintained below their respective glass transition temperatures during the applied plastic deformation.

As noted above, the applied plastic deformation is applied to at least the regions of the polymeric parts surrounding their interfaces. For example, in some embodiments, the applied plastic deformation may be localized to a bonding region adjacent to the interface between the polymeric parts. However, in some embodiments, in order to enhance uniformity and integrity of the bond, it may be desirable to uniformly deform the polymeric parts. In such an embodiment, the polymeric parts may be subjected to substantially uniform bulk deformations across their entire cross-sectional profiles. Such a deformation may be provided by a plane strain condition. However, embodiments in which a plastic deformation is applied without the use of a plane strain condition are also contemplated.

While in some embodiments, the plastic strain may be directly controlled, in other embodiments, an applied compressive stress is controlled and applied for a predetermined amount of time. For example, after placing two or more polymeric parts in contact with one another along an interface, a compressive stress that is greater than a yield strength of each of the two or more polymeric parts is applied. In one embodiment, the compressive stress may be between about 2 to 5 times a compressive yield strength of each of the parts though other stresses might also be used. The applied compressive stress may also be less than an ultimate compressive strength of each of the two or more polymeric parts. The compressive stress may be applied for a sufficient period of time so as to cause active/plastic deformation of the two or more polymeric parts and form a bond along their interface. Additionally, the compressive stress may either be constant or it may be varied during a bonding process as the disclosure is not limited in this fashion.

Without wishing to be bound by theory, suitable times to form a bond along an interface between adjacent polymeric parts will depend on various factors such as the applied compressive stress, a temperature of the polymeric parts versus their glass transition temperatures, the polymer chain lengths, as well as other appropriate processing factors. However, in one embodiment, the processing factors are selected such that the time to form a bond is less than about 5 min., 1 min., 30 seconds, 10 seconds, 1 second, 0.1 seconds, or any other appropriate time scale. Additionally, it should be understood that the time limit to form a bond using plasticity induced bonding may be greater than 0.01 seconds, 0.1 seconds, 1 second, or any other appropriate time scale as the disclosure is also not limited in this fashion either. Combinations of the above ranges are possible. For example, the bonding time may be between about 0.01 second and 1 min. However, it should be understood that any appropriate bonding time may be used as the disclosure is not limited in this fashion.

As described in more detail below, one of the processing factors affecting the overall bond strength includes the amount of plastic deformation applied to the polymeric parts. Additionally, and without wishing to be bound by theory, initially there is an increasing bond strength with increasing applied plastic strain. However, for strains above an optimal plastic strain, the bonding strength decreases. This optimal plastic strain will vary depending on the particular polymers and processing parameters used. It should also be noted that, above the maximum compressive strain limits of the polymeric materials, the bonded part will fail. In view of the above, in one embodiment, the applied compressive strain may include a plastic strain that is greater than about 1%, 2%, 3%, 4%, 5%, 10%, 15%, 20%, or any other appropriate compressive strain sufficient to provide plasticity induced bonding. Additionally, the applied compressive strain may be less than either the compressive strain limit of the polymeric parts being deformed or the compressive strain may be less than or equal to about the optimal plastic strain of the materials being used. Appropriate polymers may also have compressive strain limits that are less than about 40%, 30%, 20%, or any other appropriate strain. However, it should be understood that polymers with compressive strain limits both greater than and less than those noted above might also be used. For example, a particular polymeric material being deformed may have a compressive strain limit of about 45% and an optimal plastic strain for plasticity induced bonding of about 15%. In such an embodiment, the applied compressive strain may be between about 5% and 45% or between about 10% and 20%. In another embodiment, the applied strain may be between about 1% and a compressive strain limit of the material.

The currently described plasticity induced bonding processes may be used to form a number of different bonded geometries as described in more detail with regards to the figures. For example, in one embodiment, a bond may be formed along an entire interface between two adjacent polymeric parts. Alternatively, the bond may only be formed along a portion of the interface. For instance, the bond may be formed along at least one of the edges of the adjacent polymeric parts while leaving the remaining portion of the interface unbonded. Examples of such an embodiment might be two adjacent plastic films that are bonded at their edges to form a larger sheet, an open pouch, and/or a closed pouch. In other embodiments, the polymeric parts might be overlapped to form a lap joint in a configuration similar to sequentially layered shingles. Here the bond would be formed at the overlapping portion of the polymeric parts forming the lap joint. In yet another embodiment, the plasticity induced bond may be formed on an interior portion of the interface located between the outer edges of the overlapping polymeric parts. In view of the above, it should be understood that the described plasticity induced bonding processes may be used with any number of different geometries and that the current disclosure should not be limited to any particular arrangement or implementation. Instead, the currently described processes may be used for any number of applications and arrangements.

The polymeric parts described herein for use in a plasticity induced bonding process may take any number of different forms. Appropriate forms include, but are not limited to, films, sheets, bars, rods, laminates, fibers, bulk parts, discrete portions of parts, and/or combinations of the above. Therefore, it should be understood that any appropriate form of polymeric parts might be used as the disclosure is not omitted in this fashion.

Without wishing to be bound by theory, the strength of a plasticity induced bond is affected by the number of polymer chains entangled along an interface between two polymeric parts, the lengths of the polymer chains penetrating across the interface, and the pull out force per unit length of the polymer chains. However, these variables are affected by a number of different mechanical processing parameters and material parameters as described below. However, while various processing factors are described below, it should be understood that any bonding process is a balancing of processing and performance needs. Consequently, various combinations of the factors noted herein may be used to provide a desired balancing of processing needs and bonding strength. Therefore, the described plasticity induced bonding processes should not be limited to any particular combination of processing factors.

There are a number of different mechanical processing parameters that may be used to alter processing times, energies, and resulting bond strengths. For example, the total amount of plastic strain will affect the bonding strength as noted above and described in more detail below. Additionally, varying strain rates may also effect the bonding strength. Additionally, increasing a temperature of the polymeric parts during plasticity induced bonding will result in larger numbers of diffusion relaxation-based processes occurring faster thus resulting in more entanglements across the interface and an increased bonding strength. However, this comes with the cost of increased energy usage due to heating the materials being bonded.

There are also a number of different material parameters that may be used to alter processing times, energies and resulting bond strengths as well. These parameters include, but are not limited to, polymer chain lengths, the number of polymer chain ends available along an interface, the number of polymer chains present along an interface, and the chain end orientations. For example, and without wishing to be bound by theory, extremely long polymer chains may limit the number of polymer chains, and correspondingly the number of polymer chain ends, available along an interface to form entanglements across the interface. However, polymer chains that are too short do not offer sufficient lengths to provide a desired entanglement across the interface. In addition to the availability of appropriate numbers, and lengths of chain ends, available along an interface, the relaxation mechanisms of the polymer chains also affect the plasticity induced bond. Without wishing to be bound by theory, it is believed that the relaxation kinetics affect the plasticity induced bond because it governs the mobility, and thus the amount of material and number of polymer chains available, to form entanglements across the interface. Appropriate parameters that may be used to control the relaxation kinetics include, but are not limited to, polymer chain lengths, polymer chain stiffness, plasticizers, amounts of cross linking, amounts of crystallinity, and activation energies. Without wishing to be bound by theory, the polymer chain stiffness and activation energies are more a consequence of polymer selection and design while shorter polymer chains and inclusion of plasticizers will result in increased relaxation kinetics. Therefore, specific polymers may be selected, or designed/engineered, to provide a desired material performance, and/or those same polymers may be further controlling the polymer chain length, amount of cross linking, amount of crystallinity, inclusion of plasticizers, and/or polymer molecular weights as described in more detail below.

It should be understood that any appropriate polymer might be used for a plasticity induced bonding process. However in one embodiment, a polymer may have a molecular weight greater than about 20,000; 50,000; 100,000; or any other appropriate molecular weight. Additionally, the polymer may have a molecular weight that is less than about 500,000; 250,000; 100,000; or any other appropriate molecular weight. For example, a polymer may have a molecular weight between about 20,000 and 500,000 or between about 20,000 and 100,000.

Generally, the presently described plasticity induced bonding processes may be used with any appropriate polymeric material showing sufficient viscoelastic and/or viscoplastic properties to facilitate the formation of entanglements across an interface in response to applied stresses or plastic deformations. Appropriate polymers include amorphous polymers and semi-crystalline polymers with sufficiently low crystallinity to permit sufficient molecular mobility to form a bond during deformation. The presence of crystallinity within a polymer may either be due to crystallinity of the polymer itself, or it may be due to the inclusion of crystalline drugs or other additives embedded within the polymer matrix. In either case, and without wishing to be bound by theory, crystalline domains within a polymeric material act to limit the molecular mobility of the polymer chains, and thus the bonding ability of these polymers, even when the amorphous domains are above their glass transition temperature. While the permissible amount of crystallinity will vary depending on the particular polymer, in some embodiments, the crystallinity of a polymer may be less than about 60%, 50%, 40%, 30%, or any other appropriate crystallinity. In view of the above, the polymeric material used in the two or more polymeric parts may be at least partially amorphous or fully amorphous depending on the particular embodiment.

It should be understood that any appropriate polymer, or polymer blend, capable of forming a plasticity induced bond with another polymer might be used with the currently described processes. For example, in some embodiments, the polymeric material used for one or both of the polymeric parts may include hydroxylpropyl methylcellulose (HPMC), Poly(methyl methacrylate) (PMMA), Polystyrene (PS), polybutadiene (BR), polyisoprene (IR), polyethylene (PE), polydimethylsiloxane (PDMS) and/or Polycarbonate (PC). Alternatively, in some embodiments the polymeric material used for one or both of the polymeric parts may be suitable for use in a pharmaceutical application. Appropriate polymers for such an application include, but are not limited to, polyvinyl acetate (PVA), hydroxypropylcellulose (HPC), hydroxyethylcellulose, sodium carboxymethyl cellulose (NAMCMC) and/or polyvinylpyrrolidone (trade name Kollidon) to name a few.

As noted above, in some embodiments, a plasticizer may be included to improve the relaxation kinetics and/or compressive strain limit of a particular polymer. For example, a sufficient amount of plasticizer may be added to a particular polymer to provide a compressive strain limit greater than about 10%, 20%, 30%, 40%, or any other appropriate amount of strain. Depending on the embodiment, the amount of plasticizer may be selected to provide a compressive strain limit that is less than 100%, 80%, 60%, or any other appropriate amount of strain. Appropriate plasticizers include polyethylene glycol (PEG), triacetin, glycerol, citrate esters, phthalate esters, dibutyl sebacate, sorbitol, ethylene glycol diethyl ether, and/or any other appropriate plasticizer. While the amount of plasticizer will be dependent upon the particular polymer and plasticizer being used, in some embodiments, the plasticizers may be present in weight percentages greater than about 1%, 5%, 10%, 15%, 20% or any other appropriate weight percent. Additionally, the plasticizer may be present in weight percentages that are less than about 60%, 50%, 40%, 30%, 20%, 10%, or any other appropriate weight percent. For example, a polymer including HPMC and PEG in a weight percentage between about 4% and 20% might be used to provide a polymer exhibiting compressive strain limits between about 35% and 45%. While particular plasticizers and composition proportions are noted above, it should be understood that other appropriate plasticizers in different amounts might also be used as the disclosure is not limited in this fashion.

Depending on the embodiment, the two or more polymeric parts used in a plasticity induced bonding process may be made from the same polymeric materials. However, in other alternative embodiments, the two or more polymeric parts may be made from different polymeric materials. These different polymeric materials may simply exhibit sufficient plastic strain limits and relaxation kinetics to form a bond across their interface via entanglement of the polymer chains. Alternatively, the polymeric parts may include polymers that form a di-block copolymer when combined in addition to the creation of possible entanglements across the interface during plastic deformation. In such an embodiment, the polymeric parts are made from two different polymers including connector chains at the interface. The polymeric parts are then plastically deformed together to induce entanglement and mixing of the polymers in the region surrounding their interface. Without wishing to be bound by theory, during this deformation, the connector chains will find their way to the plastically deforming bulks on both sides of the interface leading to effective stitching of polymer chains on either side of the interface and an increased bonding strength.

In another embodiment, one or more of the polymeric parts subjected to plasticity induced bonding is capable of being cross-linked. However, prior to bonding the parts using plasticity induced bonding, the polymeric parts may include sufficiently small amounts of cross-linking to permit the bonding process. Therefore, at least some entanglement of polymer chains near and/or across interface between the parts is expected to occur during a plasticity induced bonding process. In such an embodiment, the polymeric parts may include an appropriate cross-linking agent throughout the material so that the polymeric parts can be cross-linked after bonding using a subsequent application of heat, radiation such as infrared to ultraviolet, or other appropriate type of energy. Alternatively, or in addition to the above, a cross-linking agent may be applied at an interface between two polymeric parts prior to plastic deformation. During plastic deformation of the polymeric parts where both sides of the interface is deformed, the cross-linking agent may show enhanced diffusion across the interface. Once a sufficient degree of diffusion and/or interpenetration of the cross-linking agent and polymer chains across the interface has occurred, the polymeric parts may be subsequently subjected to an appropriate energy source to cross-link the polymer including the cross-linking agent located in the region surrounding the interface.

In some embodiments, two polymeric parts that are to be bonded to one another may exhibit low adhesion to one another and/or limited plasticity for any number of reasons. In such an embodiment, it may be desirable to use another polymeric material in between the two parts to be bonded. For example a first polymeric part and a second polymeric part may be made from first and second polymers. A third polymeric part made from a third polymer may then be introduced as an intermediate material between the first and second parts. Depending on the embodiment, the yield strength of the third polymeric part may be less than the yield strength of the first polymeric part and/or the second polymeric part. Similarly, the third polymeric part may have a compressive strain limit that is greater than at least one of the compressive strain limit of the first polymeric part and/or the second polymeric part. Once appropriately arranged, the first, second, and third polymeric parts are subjected to a plasticity induced bonding process as described herein with the polymer chains from the third polymeric part forming entanglements across its respective interfaces with the first and second polymeric parts. In such an embodiment, the applied stress is sufficient to cause plastic deformation in each of the first, second, and third polymeric parts. It should be understood that the third polymeric part may either constitute a film, coating, or a bulk part located between the first and second polymeric parts as the disclosure is not limited to any particular configuration.

In some instances, it may be desirable to bond a particular type of polymer that does not exhibit sufficient plasticity at a given temperature including, for example, room temperature. Without wishing to be bound by theory, one way in which to increase the amount of plasticity exhibited by a particular polymer is to heat the polymer above room temperature to some fraction of its glass transition temperature ($T_g$). Depending on the particular embodiment, the temperature of the first and/or second polymeric parts may be greater than about $0.7T_g$, $0.8T_g$, $0.9T_g$, or any other appropriate fraction of their respective glass transition temperatures. Additionally, the temperature of the first and/or second polymeric parts may be less than or equal to about $0.95T_g$, $0.9T_g$, $0.8T_g$, or any other appropriate fraction of their respective glass transition temperatures. Please note that a polymer having a glass transition temperature of 100° C. (373 K) would be at approximately $0.8T_g$ at room temperature (assumed to be 290 K) and a polymer having a glass transition temperature of 200° C. (373 K) would be at approximately $0.6T_g$ at room temperature. While bonding below the glass transition of a material is noted above, it should be understood that deformation induced bonding may also be used at or above the glass transition of a material to further facilitate, enhance, or speed up a bonding process.

Regarding the above noted application of elevated temperatures to one or more of the polymeric parts, in one embodiment, the elevated temperatures is uniformly applied across the bulk of the polymeric parts. In this embodiment, the temperature of the polymeric parts is maintained below the glass transition temperature. Alternatively, in some embodiments, only the bonding surfaces located along the interface between the polymeric parts is heated while the bulk of the polymeric parts remain at a lower temperature below their glass transition temperatures. In such an embodiment, the temperature of the heated bonding surfaces may either be below the glass transition temperature as noted above, or the bonding surfaces may be at or above the glass transition temperature as the disclosure is not so limited. Additionally, the depth of the heated polymer on one, or both of the bonding surfaces, may be at least greater than a radius of gyration of the polymer chains in those surfaces. In some embodiments, a bonding surface may be heated between about 0.1 µm and 5 µm or between about 1 µm and 5 µm. However, any other appropriate heating depth might also be used. Without wishing to be bound by theory, even if polymer chains located on a bonding surface heated to above the glass transition temperature are tethered to an underlying bulk polymer below the glass transition temperature, when the bulk starts to plastically deform during a plasticity induced bonding process, even the tethered polymer chains will escape to form entanglements across the interface.

In some embodiments, an appropriate heater capable of heating either the bulk or surface of the polymeric part may be used as described above. In addition, the heater may be constructed so that it applies heat either directly or indirectly to the polymeric parts. For example, ultrasonic horns, radiant heat sources, direct contact heating elements, microwaves, lasers, and/or other appropriate sources might be used. Additionally, in embodiments where the polymeric parts are electrically conductive, resistive heating of the polymeric part and/or radiofrequency heating of the polymeric part might be used. Again regardless of the specific type of heating source used, a heater may be controlled to provide a desired temperature for either a bulk of the polymeric parts, or for a desired depth relative to the bonding surfaces of the polymeric parts. As discussed in more detail below, a controller may be in electrical communication to control the heater based on a sensed temperature of the polymeric parts and/or the bonding surfaces.

It should be understood that any apparatus capable of applying a desired plastic deformation to two or more polymeric parts might be used to perform plasticity induced bonding. For example, in one embodiment, a pressing element is constructed to either accept individual arrangements of two or more polymeric parts for bonding. Alternatively, continuous, or semi-continuous, parts might be supplied to the pressing element. In either case, the pressing element is constructed and arranged to apply a compressive pressure to the polymeric parts in order to apply a desired compressive plastic deformation. Several nonlimiting examples of an appropriate pressing element include, but are not limited to, one or more rollers and one or more pressing platens. In instances where one or more rollers are used to apply the desired plastic deformation, the ratio of the thickness of the polymeric parts being deformed to the radius of the one or more rollers may be between about 0.001 and 1 or between about 0.001 and 0.1. However, ratios both greater than and less than those noted above are also contemplated.

Depending on the particular embodiment, the pressing element may be constructed so that it applies a substantially bulk deformation to the polymeric parts. In some embodiments, the applied strain may be substantially uniform, or it may be non-uniform, across the bulk of the specimen as the disclosure is not limited to any particular application of strain. However, in either case, to facilitate plasticity induced bonding, in some embodiments it is desirable to induce plasticity at the interface between the polymeric parts to enhance the diffusion and interpenetration of the polymer chains. For example, in one embodiment, the pressing element may apply a plane strain to the polymeric parts. This active/plastic bulk deformation of the polymeric material in the parts may facilitate the enhanced molecular mobilization of the polymeric material relative to an interface to create a bond. In some embodiments, the pressing element may simply be constructed to apply a constant pressure, strain rate, and/or amount of total strain for a particular bonding process. Alternatively, in some embodiments, the pressing element is in electrical communication with a controller that controls the present element. The controller may control the pressing element to apply a desired compressive stress, compressive strain, and/or compressive strain rate for a desired bonding process. This control may either be used to maintain a desired parameter, or to dynamically alter it, as the disclosure is not so limited. In such an embodiment, the pressing element may also be associated with one or more sensors in electrical communication with the controller. The sensors may measure various quantities such as a deformation, applied force, applied pressure, temperature, or any other appropriate parameter. Additionally, appropriate sensors might include devices such as digital micrometers, linear voltage displacement transducers, strain gauges, load cells, thermistors, thermocouples, noncontact temperature sensors such as IR cameras and pyrometers, and any other appropriate sensors. Based on the inputs from these one or more sensors, the controller may control the applied compressive pressure, total compressive strain, compressive strain rate, material feed rate, temperature, and/or any other appropriate parameter associated with a plasticity induced bonding process.

As noted above, in some embodiments, a plasticity induced bonding process may be performed continuously. In one specific embodiment, a continuous film emerging from a solvent casting process, or other appropriate process, may be spun on a needle or other appropriate structure resulting in overlap of the curved surfaces. These curved surfaces could be continuously bonded using a plasticity induced bonding process. Alternatively, in another embodiment, a continuous, or semicontinuous, thin-film could be cast and slit into smaller width sections along its length. The individual strips could then be folded on top of each other using appropriate arrangements including, for example, converging channels. Additionally, a film might be rotated on top of another film or both films might be rotated 90° to bring them into contact with each other. In either case once the films are in contact with one another, and a plasticity induced bonding process may be applied to one or more locations along the films in a continuous bonding process. While several continuous bonding processes are described above, it should be understood that the disclosure is not limited to only the continuous bonding processes and arrangements described herein and depicted in the figures.

Turning now to the figures, several nonlimiting embodiments of a plasticity induced bonding process are described in more detail. For the sake of clarity, most of the illustrated plasticity induced bonding processes are depicted as being applied to only two polymeric parts. However, it should be understood that a plasticity induced bonding process may be applied to any number of polymeric parts including a variety of bonding interface arrangements as the disclosure is not limited to any particular number or arrangement of parts. Additionally, the plasticity induced bonding processes is depicted as being primarily applied to films. However, plasticity induced bonding processes may also be applied to bulk polymeric parts, as well as portions of bulk polymeric parts, as the disclosure is not limited in this fashion.

FIG. 1A depicts a typical bonding process where a first polymeric part 2 and a second polymeric part 4 are brought into contact with one another along an interface 8. Subsequently, elevated temperatures above the glass transition temperature in combination with relatively low pressures are applied over the timeframe of minutes or hours in order to bond the parts. During this bonding process, the polymer chains 6 located within both the first and second parts migrate across the interface and become entangled to form the bonded part 12.

Figure 1B:
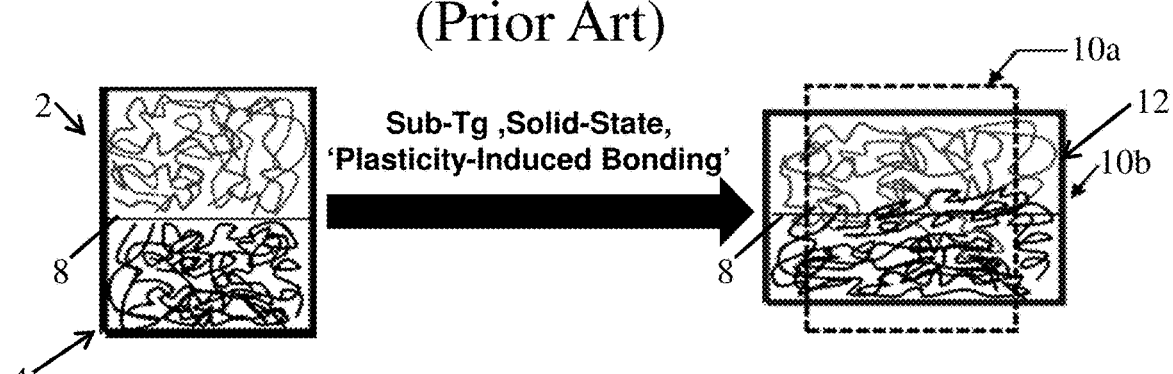
FIG. 1B is a schematic representation of polymer adhesion using plasticity induced bonding.

In contrast to typical bonding processes, as illustrated in FIG. 1B, a plasticity induced bonding process may be conducted using an interface 8 located between first and second polymeric parts 2 and 4. For example, as the polymeric parts are deformed from an initial undeformed state 10a to a plastically deformed state 10b to form a bond at the interface as a thickness of the parts is decreased indicating bulk plastic deformation. Without wishing to be bound by theory, during the active plastic deformation of the first and second polymeric parts to a desired total compressive strain, microscopic molecular mobility arising from the plastic deformation leads to interdiffusion and entanglement of the polymer chains 6 across the interface to form the bonded part 12.

Figure 2:
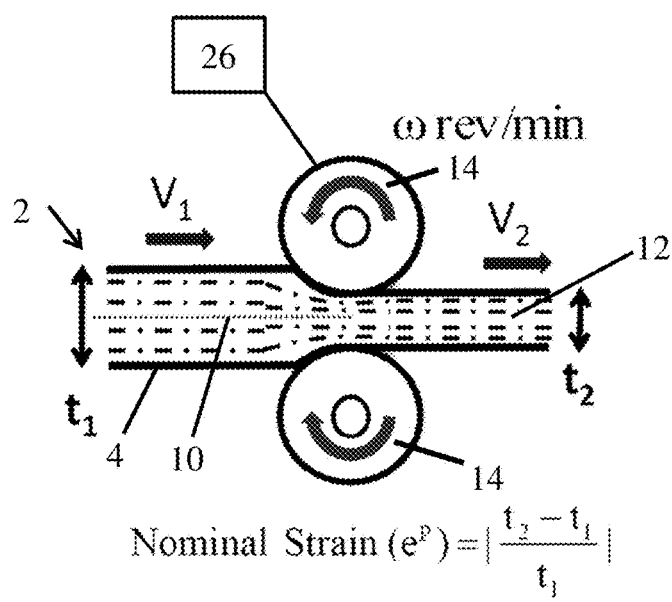
FIG. 2 is a schematic of rolling using plasticity induced bonding

FIG. 2 presents a schematic layout of a rolling apparatus used for implementing a plasticity induced bonding process. In the depicted embodiment, the system includes two opposing rollers 14 rotating in opposite directions. The first polymeric part 2 and the second polymeric part 4 correspond to two continuous films arranged with one on top of the other in the current embodiment. The adjacent polymeric parts include an interface 8 located between them. During the illustrated bonding process, the polymeric parts are initially fed into the rollers at a first velocity $V_1$ and a combined thickness of $t_1$ at an entry to the rolling device. As the first and second polymeric parts 2 and 4 pass through the nip between the rollers 14, the polymeric parts are uniformly actively/plastically deformed throughout their bulk. This plastic deformation leads to increased molecular mobilization across the interface 8 resulting in bonding of the two parts to one another. The resulting end product is a bonded part 12 exiting the rollers 14 at a velocity $V_2$ and reduced thickness $t_2$. While there may be some elastic spring back of the parts after the bonding process, the nominal plastic strain ($e^p$) applied to the parts may be estimated as the magnitude of the ratio of the difference between the two thicknesses $t_1$ and $t_2$ to the initial thickness $t_1$. The nominal plastic strain may be selected to provide a sufficient amount of plastic strain to provide sufficiently strong plastic deformation induced bond. In some embodiments, the components driving the rollers, not depicted, may be in electrical communication with a controller 26.

Figure 3A:
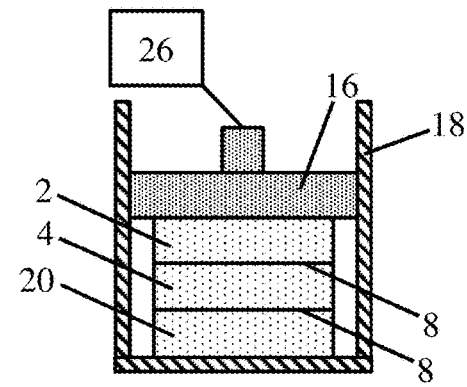
FIG. 3A is a schematic representation of a pair of pressing surfaces and associated polymeric parts used to perform plasticity induced bonding.
Figure 3B:
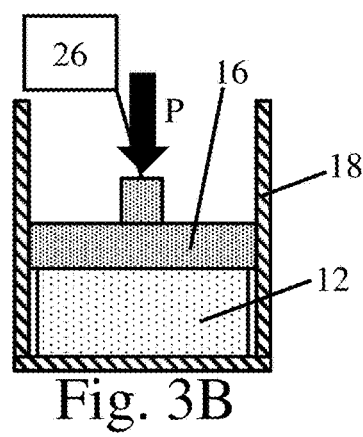
FIG. 3B is a schematic representation of the pair of pressing surfaces and the bonded polymeric part of FIG. 3A after plasticity induced bonding.

FIGS. 3A and 3B present another embodiment of an apparatus capable of implementing a plasticity induced bonding process. In the depicted embodiment, the apparatus is a simple compression apparatus which includes a pressing surface 16. The pressing surface 16 may correspond to a piston, shaft, platen, or other appropriate structure capable of applying a pressure to a surface. The apparatus also includes a corresponding chamber 18 or other appropriate pressing surface opposite the pressing surface 16. During a plasticity induced bonding process, a plurality polymeric parts, e.g. 2, 4, and 20, which may include multiple interfaces 10, are positioned between the pressing surface 16 and the chamber 18. A compressive pressure P is then applied to the polymeric parts as the pressing surface 16 is displaced downwards towards a bottom surface of the pressing chamber 18. Similar to the above noted rollers, the applied compressive pressure results in increased molecular mobilization across the one or more interfaces 8 located between the polymeric parts resulting in entanglement of the polymeric chains and hence bonding. Again the result is a bonded part 12. Depending on the embodiment, the components driving pressing surface 16, not depicted, may be in electrical communication with a controller 26.

Without wishing to be bound by theory, it should be noted that the above described apparatuses apply non-hydrostatic stresses to the polymeric parts to provide an active/plastic deformation. In contrast, a hydrostatic stress or pressure will not result in active/plastic deformation of a part due to the same pressure being applied normal to each surface of a part. Consequently, a hydrostatic pressure or stress would not result in the enhanced molecular mobilization and plasticity induced bonding as described above.

Various arrangements for forming a plasticity induced bond between two polymeric parts are illustrated in FIGS. 4-7.

Figure 4:
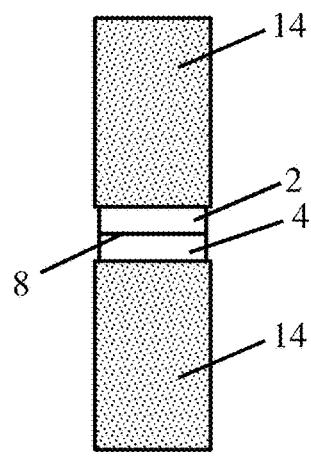
FIG. 4 is a schematic representation of a first and second polymeric part fully positioned between two opposing rollers.

FIG. 4 depicts an embodiment where a first polymeric part 2 and second polymeric part 4 are fully positioned between two opposing rollers 14. Consequently, the plasticity induced bond formed between them will extend across the entire interface 10. Such an embodiment might be useful for forming double thickness, triple thickness, or other thickness films. However, this arrangement may also be applied to other configurations as well.

Figure 5:
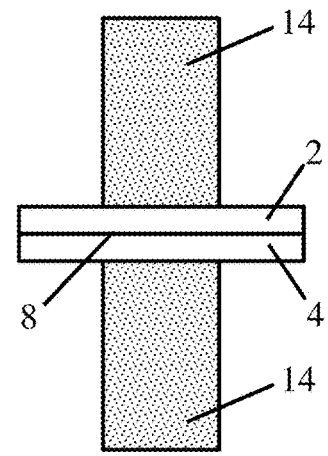
FIG. 5 is a schematic representation of a first and second polymeric part positioned with opposing rollers located on an interior portion of the overlapping parts.
Figure 6:
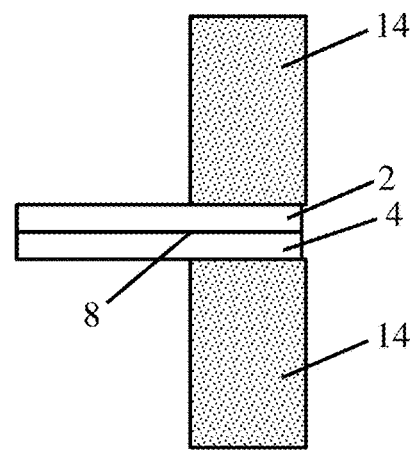
FIG. 6 is a schematic representation of a first and second polymeric part positioned with opposing rollers located on an aligned outer edge.

FIG. 5 illustrates an embodiment where a first polymeric part 2 and second polymeric part 4 are only partially positioned between two opposing rollers 14. Specifically, the rollers are located on an interior portion of the polymeric parts between their exterior edges. Consequently, plasticity induced bonding will only occur within this interior portion of the polymeric parts located between the rollers 14. Similarly, FIG. 6 depicts an embodiment where the rollers 14 are located along an edge of two polymeric parts 2 and 4 positioned with one on top of the other. Therefore, the plasticity induced bond will only be formed on a portion of the interface 10. However, in this particular embodiment, the bond will correspond to a bond along an exterior edge of the polymeric parts. This particular arrangement might be useful for the formation of seals along an edge of a polymeric pouch or capsule.

Figure 7:
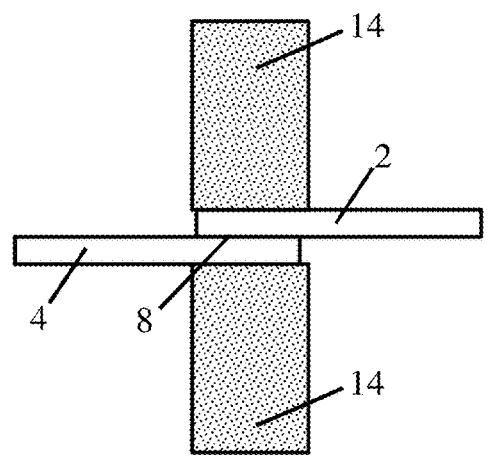
FIG. 7 is a schematic representation of a first and second polymeric part positioned with a lap joint between two opposing rollers.

FIG. 7 depicts an embodiment of a plasticity induced bonding process used to form a lap joint between two opposing rollers. As illustrated in the figure, only a portion of the first polymeric part 2 and second polymeric part 4 are overlapped with one another with the remaining portions of the polymeric parts extending in opposite directions similar to overlapping shingles. The rollers 14 then form a plasticity induced bond along at least a portion of the overlapped interface 10.

While specific arrangements for forming a plasticity induced bond between two polymeric parts has been discussed above and illustrated in figures, it should be understood that other arrangements are also possible. Additionally, while these arrangements have been depicted as being formed using a pair of opposing rollers, other apparatuses capable of forming a plasticity induced bond are also contemplated as noted previously.

Figure 8:
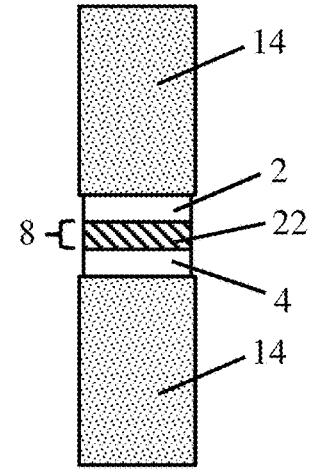
FIG. 8 is a schematic representation of a first and second polymeric part positioned between two opposing rollers and including an intermediate material between the two polymeric parts.

FIG. 8 presents an embodiment where an intermediate polymeric material 22 is positioned at an interface 8 located between two polymeric parts 2 and 4. As noted previously, this intermediate material may be in the form of a coating, film, or bulk part as the disclosure is not so limited. Additionally, in instances where the first and second polymeric parts 2 and 4 show limited adhesion to one another and/or plasticity, the intermediate material may have an yield strength that is less than yield strength of one or both of the other polymeric parts and a compressive strain limit that is greater than one or both of the other polymeric parts. In either case, upon sufficient plastic deformation of the resulting stack, a plasticity induced bond is formed across the interfaces between the intermediate material 22 and the two polymeric parts located on opposing sides of the intermediate material.

Figure 9:
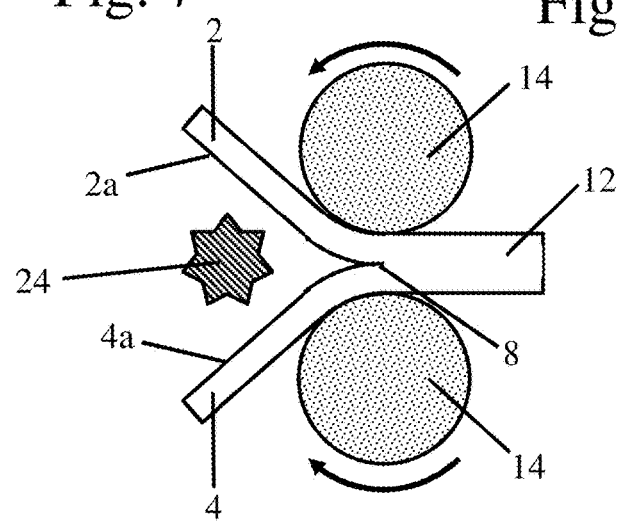
FIG. 9 is a schematic representation of first and second polymeric parts having their bonding surfaces heated prior to undergoing plasticity induced bonding using a set of rollers.

FIG. 9 depicts an embodiment of a system for performing plasticity induced bonding similar to the rollers depicted in FIG. 2. However, in the current embodiment, the system also includes one or more heaters 24 used for heating the bonding surfaces 2a and 4a of the polymeric parts. As depicted in the figure, the heater is using a radiant heat source that applies heat to the bonding surfaces 2a and 4a which are located on opposing sides of the heater. Consequently, as the two polymeric parts 2 and 4 are pulled through the rollers 14, the bonding surfaces 2a and 4a are subjected to the radiant heat from the heater 24. By controlling the amount of applied heat per unit area of bonding surface as well as the speed at which the polymeric parts are pulled through the rollers, a temperature of the bonding surfaces and/or bulk of the polymeric parts may be controlled. While a radiant heater has been depicted in the figure, as noted previously, other types of heaters may also be used. It should be understood that the above configuration can be modified for use with multiple layers as well as the disclosure is not limited to heating arrangements for any particular number of layers being bonded.

Figure 10:
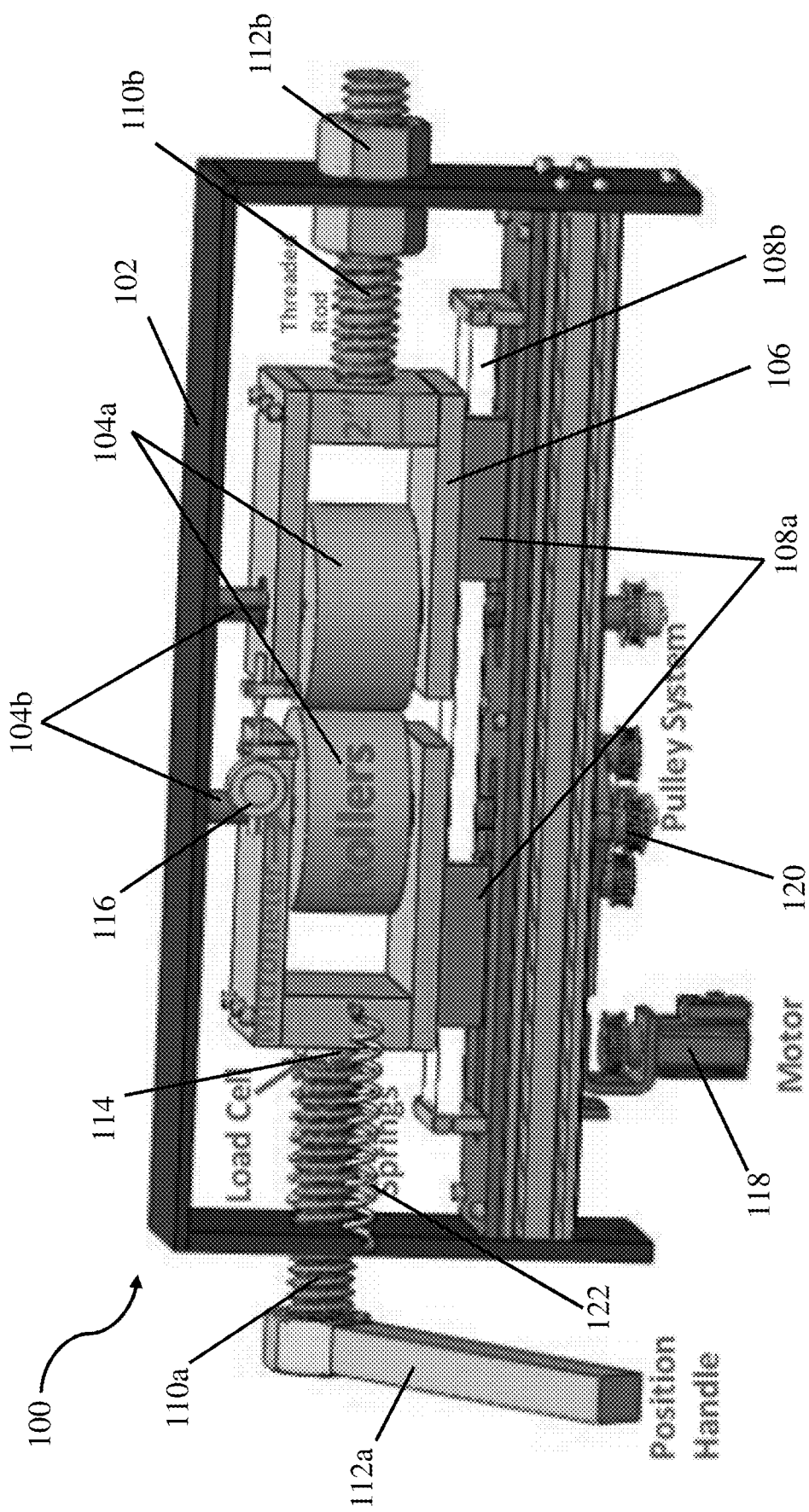
FIG. 10 is a schematic representation of a roll bonding system used to perform plasticity induced bonding.

FIG. 10 depicts one embodiment of a roll bonding system 100 designed for performing plasticity induced bonding of polymer films. The roll bonding system includes an outer frame 102 used for supporting two opposing cylindrical rollers 104a. The two cylindrical rollers are movably supported on the outer frame using two U shaped roller frames 106 through which two separate rotary shafts 104b are mounted. The roller frames 106 are mounted to two separate stages 108a. The stages are slidingly mounted on a linear rail 108b. The stages carrying the rollers 104a may be translated along the long axis of the rail to adjust a distance between the rollers. However, embodiments in which the stages are fixed relative to the outer frame are also contemplated. The position of stages 108a, and correspondingly the rollers 104, may be adjusted using the two threaded-rods 110a and 110b using the depicted position adjustment mechanisms 112a and 112b corresponding to a rotatable handle and locking nut arrangement respectively. While a particular arrangement for adjusting the position of the rollers has been depicted, it should be understood that other possible arrangements might be used including, for example, stepper motors and associated threaded shafts, hydraulic actuators, electrical solenoids, and any other appropriate arrangement. The rollers 104a are powered using a motor 118 mounted to the outer frame 102. The motor 118 is drivingly connected to an appropriate transmission system 120 for transferring the motor output to the rollers. For example, as depicted in the figures, the motor and transmission may include a system of pulleys and double sided timing belts using a stepper-motor. The stepper motor is attached to the outer frame. During operation of the roll bonding system, an appropriate level of tension may be maintained in the timing belt used to drive the pulleys on the rotary shafts through the use of an idler pulley that accommodates slack in the timing belt as the rollers are brought closer together. While the depicted transmission system transfers power to both rollers, embodiments in which power is only transferred to one of the rollers and the other is permitted to freewheel are also contemplated. Additionally, embodiments in which the individual rollers have separate motors associated with them may also be implemented. While a particular arrangement of components has been described above and depicted in the figure, it should be understood that any appropriately configured rolling system may be used to form a plasticity induced bonding process.

In order to facilitate application of a desired line loading and/or total applied strain, it may be desirable to prevent unwanted deflection, deformation, and/or failure of the various components when a compressive load is applied by the rollers. Thus, in some embodiments, a compliance of the roll bonding system may be minimized. Alternatively, or in addition to the above, a compliance curve of the roll bonding system may be measured and used to correct for a compliance of the system in order to provide a desired line loading and/or total applied strain. Essentially, in order to provide a desired deformation for a bonding process, it may be desirable to minimize, or eliminate, excessive deflection, plastic deformation, and failure of the various components of a bonding system being used in a plasticity induced bonding process.

In addition to the basic physical components of the roll bonding system 100, various sensors may be integrated with the system. For example, the distance between the rollers 104a may be measured using a micrometer or other appropriate length measurement device as noted previously. Additionally, a load cell 114 may be mounted between one or both of the rollers 104a and the associated threaded rods 110a and 110b in order to measure the compressive loads applied to materials passing through the rollers. Specifically, in the depicted embodiment, the load cell is located between one of the roller frames 106 and the threaded rods.

In one embodiment, during operation of the roll bonding system, one of the stages 108a is held stationary while the other is adjusted to a desired position. The other stage may then be adjusted to an appropriate position to provide a desired gap between the rollers 104a. For example, as depicted in the figure, the position of the rightmost roller associated with the locking nut arrangement, position adjustment mechanisms 112b, is held stationary while the roller associated with the handle, position adjustment mechanism 112a, is adjusted to a desired position by rotating the handle to drive the associated threaded rod 110a. Correspondingly, the rotatory motion of the handle drives the threaded rod 110a causing the associated stage 108a to translate along the long axis of the rail 108b to a desired position. In some embodiments, one or more extensional springs 120 may be used to mount one, or both of the roller frames 106 to the associated threaded rods 110a and 110b. However, other methods of retaining the rollers relative to a particular component of the roll bonding system may also be used including, for example, captured ball joints, captured rotational bearings, or any other appropriate configuration as the disclosure is not so limited.

Once appropriately positioned, a roll bonding system may be operated in either a constant load mode or a constant displacement mode. In a constant load mode the position of the unlocked stage 108, and associated roller 104a, may be adjusted until a desired magnitude of force, corresponding to a desired compressive pressure, is measured by the load cell. This may either be done manually as in the depicted system, or it may be controlled automatically using a controller, motor, and feedback loop. Alternatively, in a constant displacement mode the distance between the rollers may be measured and set using an appropriate distance measuring device such as a micrometer 116. Again this may either be done manually or automatically using an appropriate controller, motor, and feedback loop associated with the distance measuring device.

Example: Plastic Deformation Analysis

Figure 11:
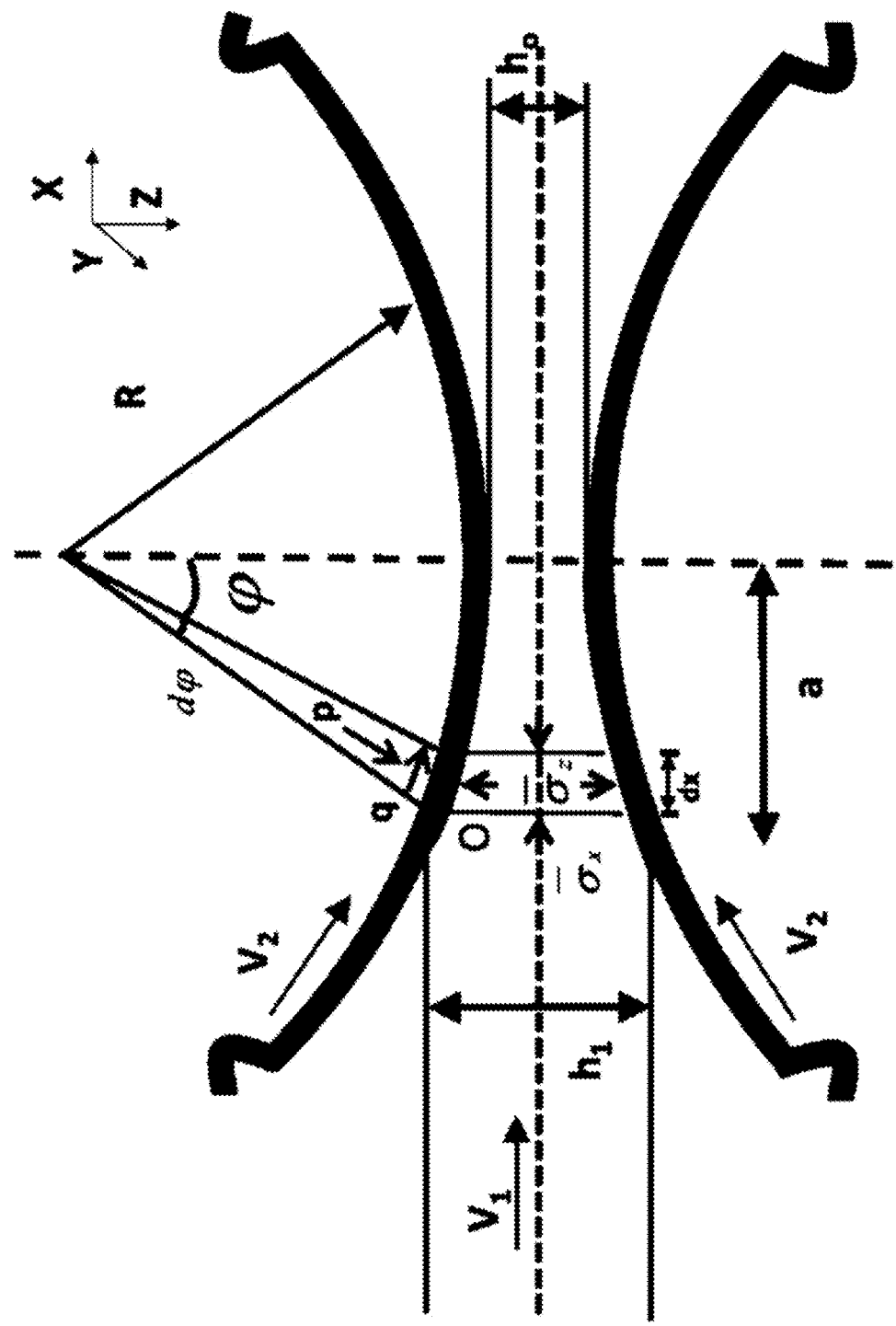
FIG. 11 is a schematic representation of a perfect plastic deformation analysis of the line loading of a thin strip using two opposing rollers.

FIG. 11 is a schematic representation of a perfect plastic deformation analysis of the line loading of a thin strip using two opposing rollers for the purpose of estimating the loads when an incoming strip is passed through the rollers to produce an appreciable reduction in thickness and the desired plastic deformations are large compared with the elastic deformation. It should be understood that such an analysis involves various assumptions and only provides an estimate of the expected deformations and stresses applied during a rolling process. In general, the total strain ($e^{total}$) comprises both plastic ($e^p$, non-recoverable) and elastic ($e^e$ recoverable) strains i.e. $e^{total}=e^e+e^p$. To a first approximation the elastic strain can be ignored assuming that the plastic strains will dominate in this deformation processing situation, i.e. $e^{total}$ is about $e^p$. The material can therefore be treated as a rigid-plastic, i.e. a material which is perfectly rigid prior to yielding and perfectly plastic afterwards. If the depicted rollers are also considered to be rigid, the elastic deformation of the rollers can also be neglected. Typically when the coefficient of friction between the rollers and strip is large, and/or the strip has a lower yield strength the frictional traction at the interface exceeds the yield stress of the strip in shear so that there is no slip in the conventional sense at the surface i.e. plastic shear will take place in the rolled stock, while the surface will "stick" to the rolls with static friction. Here, an elementary theory based on a no-slip assumption is applied. In addition to the above, it can be assumed that a homogenous deformation has been applied to the strip implying that vertical segments of the bar deform vertically, as if they were separated from each other, so that no shear stress can arise in them. FIG. 11, shows the rigid-plastic rolling model.

The mean longitudinal (compressive) stress in the strip is denoted by $\bar{\sigma}_x$ and the transverse stress at the surface by $\bar{\sigma}_z$. The equilibrium of the element gives $$\bar{\sigma}_z dx = (p \cos \phi + q \sin \phi) 2R d\phi \tag{1}$$

and $$d(h\bar{\sigma}_x) = (p \sin \phi - q \cos \phi) 2R d\phi \tag{2}$$

Since it has been assumed that a plane strain condition exists along the y-direction $e_y = \delta e_y = \dot{e}_y = 0$. This in accordance with Levy-Mises flow rule leads to $$\bar{\sigma}_y = \frac{1}{2}(\bar{\sigma}_x + \bar{\sigma}_z) \tag{3}$$

This implies that stress in the y-direction is the mean of those in x and z directions. Since the von mises yield criterion is based on the equivalent stress, the plastic flow zone there is $$\bar{\sigma}_z - \bar{\sigma}_x = Y = 2k \quad (4)$$

Although it has been assumed to be a homogenous state of stress in the element, which is not the case at the surface, equations 1, 2, and 4 can be combined to get $$\frac{d}{d\phi} h(p + q\tan\phi - 2k) = 2R(p\sin\phi - q\cos\phi) \quad (5)$$

This is also known as von Karman's equation. For relatively large rolls we assume $\sin\phi \approx \phi$ and $\cos\phi \approx 1$ etc. and retain only first order terms in $\phi$. The roll profile is then $$h \approx h_o + R\phi^2 \approx h_o + x^2/R \quad (6)$$

Making these approximations in equation 5 and neglecting the term $q \tan\phi$ compared with p, and changing the position variable from $\phi$ to x the following is obtained $$h\frac{dp}{dx} = 4k\frac{x}{R} + 2q \quad (7)$$

As an approximation h can be replaced by the mean thickness $$\bar{h} = \frac{1}{2}(h_o + h_i)$$

and q can be assumed to reach the yield stress k (where $k=2/\sqrt{3}K$, where K is the shear yield stress) throughout the contact arc. Equation 7 then becomes $$h\frac{dp}{dx} = 2k\left(2\frac{x}{R} \pm 1\right) \quad (8)$$

The positive sign applies to the entry region where the strip is moving slower than the rolls and the negative sign applies to the exit. Equation 8 can be integrated, with boundary conditions that $\bar{\sigma}_x = 0$ at entry and exit, to give the pressure distribution at entry as $$\frac{\bar{h}}{a}\left(\frac{p}{2k} - 1\right) = (1 - x/a) - \frac{a}{R}(1 - x^2/a^2) \quad (9)$$

and at exit $$\frac{\bar{h}}{a}\left(\frac{p}{2k} - 1\right) = -x/a - \frac{ax^2}{Ra^2} \quad (10)$$

The pressure at the neutral point is common to both these equations, which locates that point at $$\frac{x_n}{a} = -\frac{1}{2} + \frac{a}{2R} \quad (11)$$

The line loading per unit width is then found to be $$\frac{P}{ka} = \frac{1}{ka}\int_{-a}^{0} p(x)dx \approx 2 + \frac{a}{\bar{h}}\left(\frac{1}{2} - \frac{1}{3}\frac{a}{R}\right) \quad (12)$$

and the moment applied to the rolls is found to be $$\frac{M}{ka^2} = \frac{1}{ka}\int_{-a}^{0} xp(x)dx \approx 1 + \frac{a}{4\bar{h}}\left(1 - \frac{a}{R}\right) \quad (13)$$

If it is assumed that k=Y/2=3 MPa, h1=1 mm, ho=0.8 mm, then 2d=0.2 mm (indicating 20% plastic compression). If R is chosen to be 100 mm then a=4:47 mm. Substituting these variables in equation 19, P is estimated to be about $5.91 \times 10^4$ N/m. If a width of 20 mm is assumed, then load L works out to be nearly 1182 N. Again if an approximate speed is about 3 cm/min then residence time is about 8:94 seconds. It is worth mentioning that rigid-plastic analysis does not take into account any strain hardening, and in an actual process compression loads may be larger. However, in this analysis, the moment per unit depth works out to be about 94.44 N and hence a total torque for a 20 mm wide strip works out to be 0.124 Nm.

The rigid plastic analysis strongly suggests that it is possible to achieve bonding over a few seconds of active/plastic deformation if rollers with R=10 cm are chosen at a feed rate of about 3 cm/min. After choosing rollers for an actual roll bonding system, other machine elements such as shafts, bearings, supports, plates, belts, were selected and sized to operate at least up to a few kilo-Newtons of load. Its worth mentioning that yield strength of the currently investigated polymers were about 6 MPa, and therefore only 1-2 kN of load was sufficient to achieve roll-bonding. No special loadbearing machine elements were needed. However, if polymers with large yield strengths are to be considered, then appropriate loading considerations should be taken into account for machine design.

While the described analytical model may be used to predict stresses, strains, associated with a particular roller design, during actual operation, like any other machine operation, the compression loads and angular-speed of rollers may either be held constant or dynamically updated as the disclosure is not limited in this fashion.

Example: Deformation and Relaxation of a Polymer Chain

Figure 12:
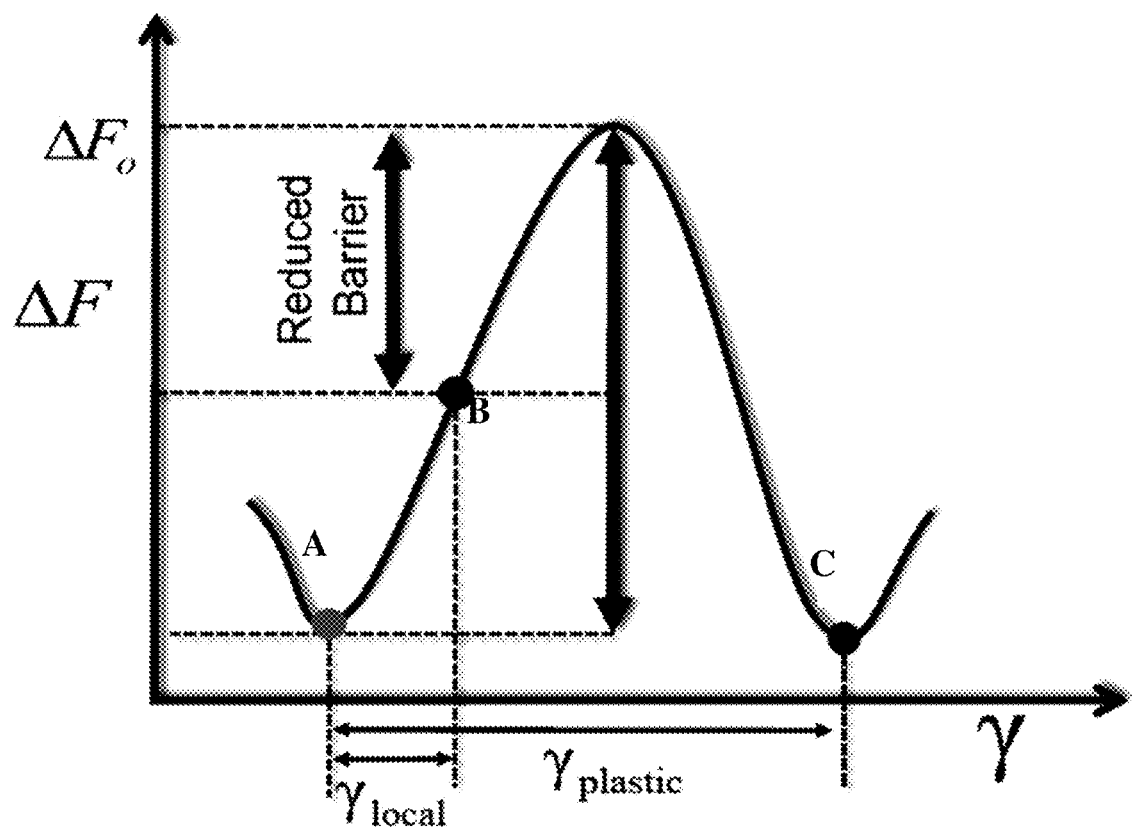
FIG. 12 is a schematic representation of a potential energy landscape during plastic-relaxation.
Figure 13:
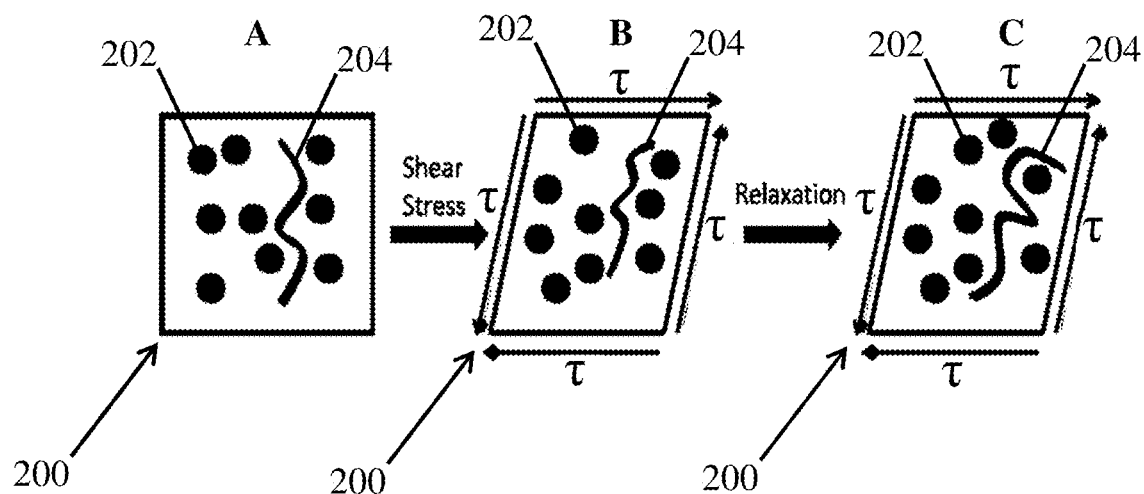
FIG. 13 is a schematic representation of polymer mobility, plastic relaxation, and plastic deformation of a polymer.

Without wishing to be bound by theory, polymers undergoing active/plastic deformation exhibit enhanced molecular mobility even below $T_g$. FIG. 13 demonstrates the qualitative effect of stress on a small element of the polymer 200 and Plastic-relaxation. Well below $T_g$ polymer chains are kinetically trapped in their local configurations and timescales for mobility (or motions) of these chains are extremely large (for e.g. orders of several months or years). Now consider a material element of such a polymer 200, FIG. 13. This figure shows a particular polymer chain 204 in a locked-in state A within the surrounding polymer chains 202. For the polymer chain 204, under consideration, to change its orientation it needs to overcome the potential barrier due to surrounding Van der Walls interactions with neighboring chains, and therefore it is trapped in the potential well in the A configuration shown in FIG. 12.

Once some amount of shear stress is applied to the polymer 200 the depicted element deforms elastically as a whole and upon removal of the stress the material element will relax back to its original state. In the elastic limit, shear stress applied to the material element causes shear-strain. The deformed state is indicated by configuration B of the polymer chain 204 and surrounding polymer chains. Within the material element, during elastic-loading caused by shear stress, the polymer chains (or their segments) undergo flexing. The work done due to application of shear stress on the material volume is stored as internal (i.e. elastic) energy due to bending, torsion, rotation, etc. of several polymer chains which themselves are interacting with each other through Van der Walls interactions. The sum total of elastic energies stored due to flexing of all the polymer chains within the material volume is equal to the total elastic strain energy of the material element. For the given polymer chain under consideration, a rise in free-energy (or elastic energy) occurs due to its flexing, and this chain climbs up the potential barrier set up due to surrounding chains corresponding to configuration B indicated in FIG. 12 depicting the potential energy landscape. So far everything is elastic and recoverable. Therefore, strains are stored as elastic or free-energy, and upon removal of the applied stress the material element 200 relaxes back to the initial configuration A, as does the polymer-chain 204. However, if in the B configuration, the polymer chain 204 gets a local (thermal or otherwise) perturbation or excitation then it has the ability to slip past local inhibitions and move to a totally new configuration C by hopping over the potential barrier. Once over the potential barrier, the polymer chain 204 becomes trapped in a new potential well. However, this time going from B to C, the transition is not recoverable, i.e. even if the stresses are removed from the material the polymer chain 204 still would not return to its original configuration A. Since the chain has changed its permanent mean configuration this is known as 'plastic-relaxation'. Note that if the stresses are large enough then an increase in the free-energy of the polymer chain 204 in configuration B can be sufficient to facilitate the hop over the barrier. For example, the B configuration may be located close to the top of the energy barrier.

The following should be noted with respect to plastic-relaxation: (1) If no stresses were applied, and temperature were held far below $T_g$, then the transition of mean configuration of the polymer chain 204 from A to B or A to C would not happen on experimental time scales. However, qualitatively speaking, the application of stress has enhanced the mobility of the polymer chain as it goes from configuration A to B or A to C. How long the polymer chain 204 stays in the B configuration before it relaxes to C is totally dependent on the molecular characteristics of the polymer, levels of stresses applied, and the local temperature. It should also be noted that the irreversible work done moving the polymer chain 204 from A to C is irrecoverable, or irreversible, mechanical work that is dissipated into the surrounding polymer media and is usually low at moderate rates of deformation.

In view of the above, the enhanced mobility of polymer chains due to plastic-relaxations may be used at an interface between two polymeric parts to facilitate the formation of entanglements across the interface and thus achieve bonding.

Example: Temperature Rise During Bonding

Regarding the strain and relaxation events described above regarding the polymer chain depicted in FIGS. 12 and 13, the material has undergone irreversible mechanical work in the form of the plastic work done to move the polymer chain from configuration 204 to the configuration 208. This work is dissipated into the surrounding polymer media. However, this dissipation of head leads to a negligible temperature rise as detailed below. Specifically, in the context of a HPMC PEG-400 material: the measured heat capacity ($C_p$) of the material was measured to be 1860 J/KgK and the measured density ($\rho$) was 1180 Kg/m³. Similarly, the estimated flow-stress ($\sigma$) was about 8 MPa and the estimated plastic strain ($\varepsilon$) was about 0.5. Consequently, the adiabatic temperature rise is given by:

$$\Delta T_{adiabetic} = \frac{\sigma \varepsilon}{\rho C_P} \sim 3.6° \text{ C}.$$

In view of the above, even assuming a fully adiabatic process hardly gives any temperature rise.

Example: Entanglement Across an Interface v. Polymer Chain Length

Figure 14:
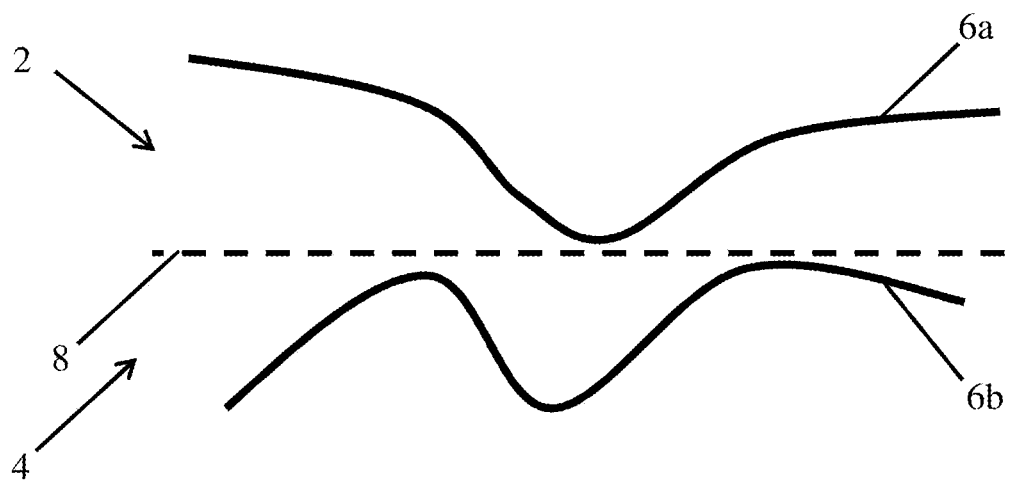
FIG. 14 is a schematic representation of two polymeric parts including polymer chains that do not include a polymer chain end located near the interface.
Figure 15A:
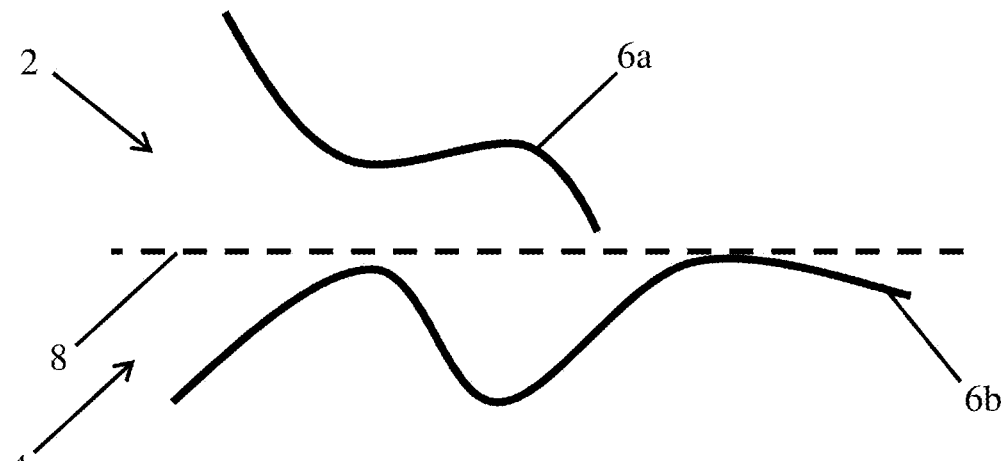
FIG. 15A is a schematic representation of two polymeric parts including a polymer chain with a polymer chain end located near the interface.
Figure 15B:
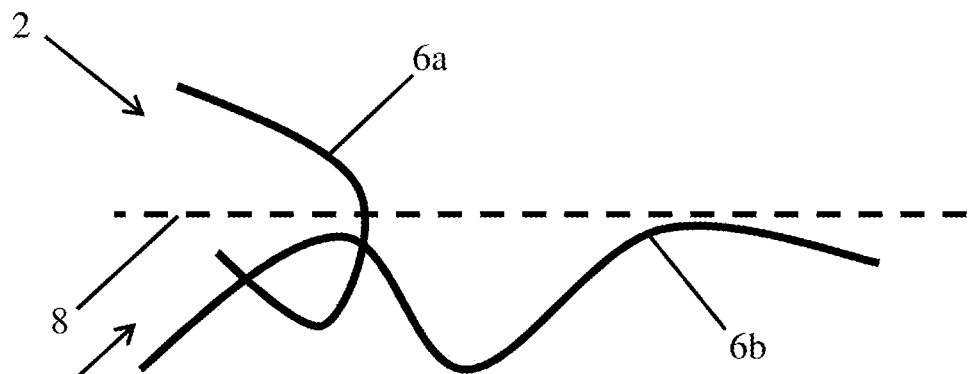
FIG. 15B is a schematic representation of the two polymeric parts of FIG. 15A after plasticity induced bonding where the polymer chains of the two parts have become entangled.

Without wishing to be bound by theory, FIGS. 14-15B illustrate the interplay of polymer chain length versus entanglement in bonding strength.

FIG. 14 is a schematic representation of two polymeric parts including polymer chains 6a and 6b that do not include a polymer chain end located near the interface 10. Such an arrangement may occur where the polymer chains are relatively long and few chain ends are located near the interface. Consequently, when the polymeric parts 2 and 4 are deformed, fewer chain ends will be present to cross the interface 8 and form entanglements on the other side. However, it should be understood that bonding may still occur across the interface though it may involve fewer polymer chains and polymer chain ends.

FIGS. 15A and 15B are schematic representations of two polymeric parts including a polymer chain with a polymer chain end located near the interface. Initially, the polymer chain 6a is located on one side of the interface 8 in polymeric part 2. However, since the polymer chain 6a has a polymer chain end located near the interface, during plastic deformation this polymer chain end is able to migrate across the interface 8 and form an entanglement with the polymer chain 6b located on the other side of the interface within polymeric part 4. Again without wishing to be bound by theory, increasing numbers of chain ends located along the interface are associated with decreasing polymer chain lengths. However, as noted previously decreasing chain lengths also may result in decreased entanglement and pullout force/strength. Consequently, choosing a particular polymer chain length for use in a plasticity induced bonding application will likely be a balance between providing sufficient number of polymer chain ends for forming entanglement versus providing sufficiently long polymer chains to provide a desired bonding strength associated with those entangled polymer chains.

Example: Material Preparation

Polymeric-films were prepared from solvent casting using hydroxypropyl-methylcellulose (HPMC), trade name METHOCEL in grades E3 and E15 as well as PEG-400. Appropriate amounts of E3, E15 and PEG were mixed in desired amounts with ethanol and water to obtain a homogeneous solution using an electric stirrer over a 24 hr period. After blending, the solution was carefully stored in glass bottles and allowed to rest for 12 hr to get rid of air bubbles. Solvent casting was carried out using a casting knife applicator from Elcometer on a heat-resistant Borosilicate glass substrate and the films were allowed to dry. All steps were carried out under ambient conditions of about 20°±2° C. Table I below shows the sample weights of the contents used to prepare various films used in the experiments described herein.

TABLE I

| Polymer film | Composition | | | | |
|---|---|---|---|---|---|
| | E3 (g) | E15 (g) | Water (g) | EtOH (g) | PEG (g) |
| E3/E15 in 1:1-0% PEG | 15 | 15 | 96 | 96 | 0 |
| E3/E15 in 1:1-28.5% PEG | 15 | 15 | 96 | 96 | 12 |
| E3/E15 in 1:1-42.3% PEG | 15 | 15 | 96 | 96 | 22 |
| E3/E15 in 1:1-59.5% PEG | 15 | 15 | 96 | 96 | 44 |
| E3-alone-42.3% PEG | 30 | 0 | 96 | 96 | 22 |
| E15-alone-42.3% PEG | 0 | 30 | 96 | 96 | 22 |

Karl Fischer titration was carried out to determine the residual moisture content in the films after drying. The estimated residual moisture in the films is shown in Table II below.

TABLE II

| Polymer film | Residual H$_2$O (% Wt.) |
|---|---|
| E3/E15 in 1:1-0% PEG | 3.7 |
| E3/E15 in 1:1-28.5% PEG | 7.21 |
| E3/E15 in 1:1-42.3% PEG | 4.29 |
| E3/E15 in 1:1-59.5% PEG | 2.45 |
| E3-alone-42.3% PEG | 2.92 |
| E15-alone-42.3% PEG | 4.54 |

Example: Plasticizers

Figure 16:
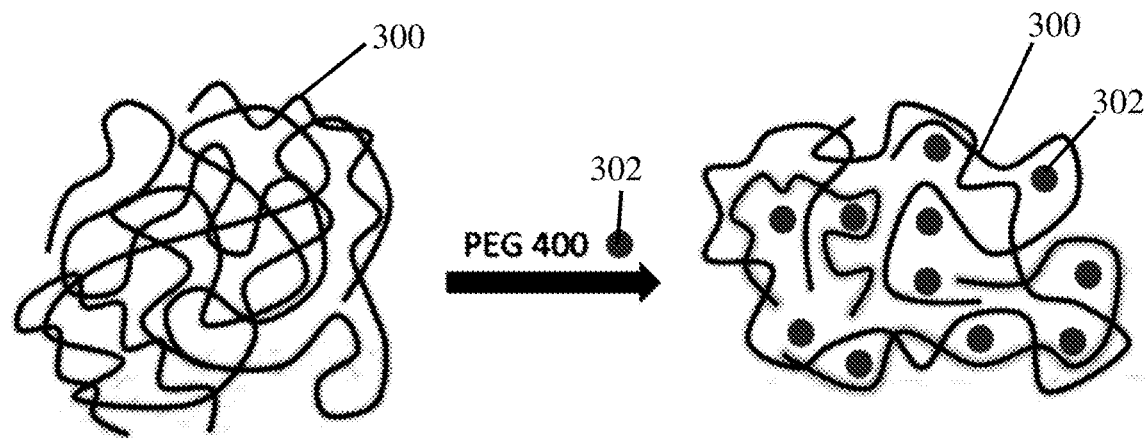
FIG. 16 is a schematic representation of a plasticizer having been added to a polymer matrix.

FIG. 16 qualitatively shows the effect of including a plasticizer 302 in a polymer matrix 300. Without wishing to be bound by theory, the plasticizer weakens the secondary interactions between the chains thus increasing the free volume of the material. Additionally, the plasticizer lowers the glass transition of the polymeric material. In response to the increased free volume, and increased kinetics associated with a lowered glass transition temperature, a macroscopic ductility (or plasticity) of the polymeric material including the plasticizer may be increased as individual polymer chains are able to more easily slip past each other.

Example: Experimental Material Manufacture

In several of the presented experiments, approximately 100 µm to 150 µm thick polymeric thin films were solvent cast using appropriate solvents, a base polymer hydroxypropyl methylcellulose (HPMC) (METHOCEL e3 and e15 in a 1:1 ratio), and plasticizer Polyethylene glycol 400 (PEG-400). The produced materials exhibited large plastic-flow characteristics and were capable of bonding at ambient temperatures through the use of bulk-plastic-deformation. These materials could have also been produced by a variety of other processes such as extrusion, spray deposition, and spin-coating to name a few.

Example: Glass Transition Temperature v. Plasticizer Concentration

Table III presents the glass transition temperatures of various weight percentages of PEG-400 in HPMC E3/E15 as measured using dynamic mechanical analysis at a frequency of 1 Hz and a temperature ramp of 5° C./min.

TABLE III

| PEG-400 wt % | Tg (° C.) |
|---|---|
| 0% | 185.0 |
| 28.5% | 109.1 |
| 42.5% | 89.7 |
| 60.5% | 71.4 |

Example: Stress Strain Behavior v. Plasticizer Concentration

Figure 17:
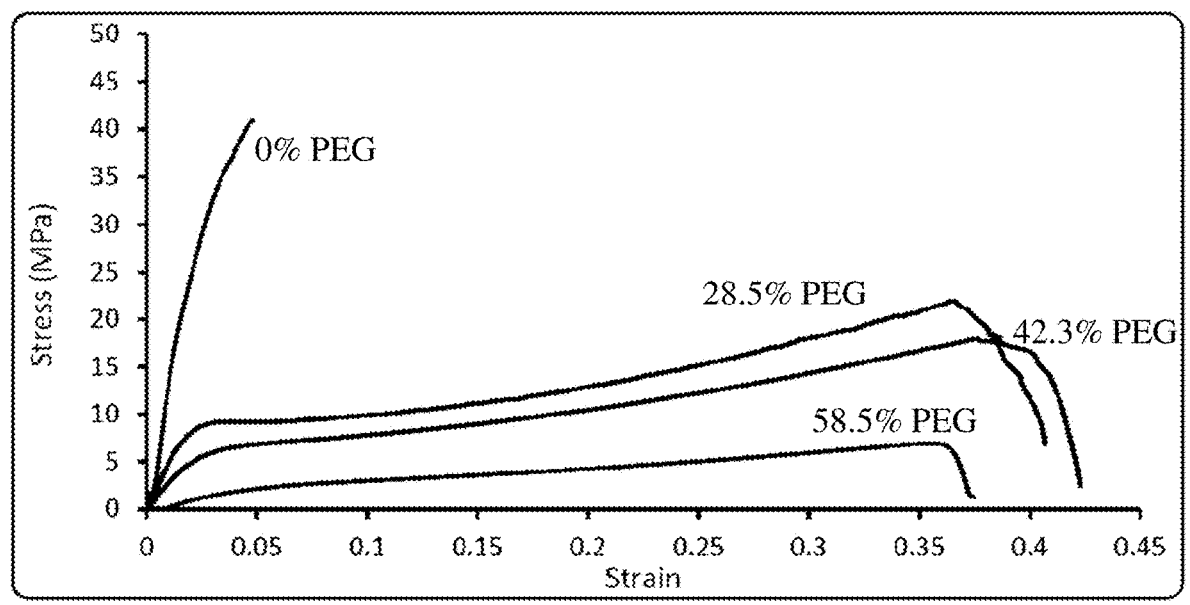
FIG. 17 is a graph of stress versus strain for different amounts of polyethylene glycol-400 (PEG 400) in a HPMC (e3:e15 in a 1:1 ratio) system.

FIG. 17 presents true stress-strain curves for a HPMC-PEG blend with different weight percent loadings of PEG in the solid-state polymer. The polymer including 0 wt % PEG exhibited a compressive strain limit of about 5%. In contrast, the polymers including 28.5%, 42.3%, and 58.5% PEG exhibited strain limits between about 35% in 45%. When subjected to a plasticity induced bonding process, the polymer films exhibiting large plastic flow characteristics, due to the inclusion of the plasticizer, formed bonds at ambient temperature.

Example: Molecular Weight

Viscosity measurements for 2% aqueous solutions of E3 and E15 were carried out using a HR-3 Hybrid rheometer. Using relationships between the viscosity and molecular weight relationship for E3 and E15, the number average molecular weight ($M_n$) for E3 and E15 is approximately 8,200 and 20,000, respectively.

Example: Nanoindentation

Nanoindentation tests were carried out on Triboindenter Hysitron for films made using E3 and E15 in a ratio of 1:1 with 0% PEG and 42.3% PEG, Testing was also conducted for E3 alone with 42.3% PEG and E15 alone with 42.3% PEG. The experiments were carried out in a force controlled mode with a maximum force of 300 µN and a Berkovicz indenter with a root radius of 150 nm. The film with 0% PEG film showed relatively large indentation depths and large elastic recovery, whereas films with 42.3% PEG showed very little elastic recovery and large residual indentation depth. Based on these behaviors, the 0% PEG film may be referred to as an 'elastic' film and the 42.3% PEG film may be referred to as a 'plastic' film. Using the Oliver-Pharr method, the hardness was estimated from the nano-indentation tests. The hardness values for: E3/E15 in a 1:1 ratio and 0% PEG was 144.0 MPa; E3/E15 in a 1:1 ratio and 42.3% PEG was 10.83 MPa; E3 alone and 42.3% PEG was 10.151 MPa; and E15 alone with 42.3% PEG was 11.48 MPa. This clearly shows that the film with 0% PEG is extremely "hard" relative to the films including 42.3% PEG, and as described below may be more difficult to bond in certain applications.

Example: Roll Bonding System

Figure 18A:
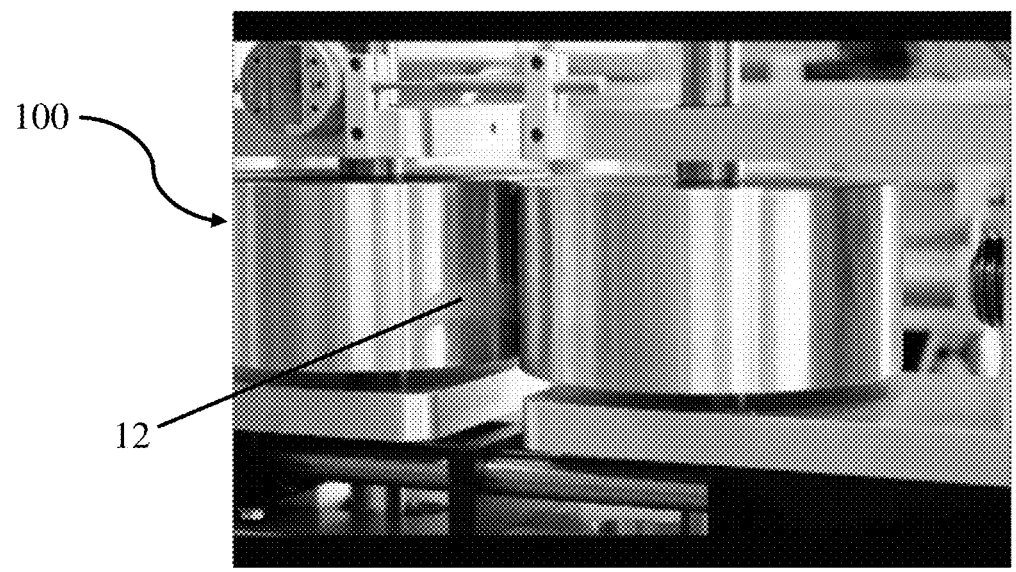
FIG. 18A is a photograph of a roll bonding system and a bonded part being exiting from the rollers.
Figure 18B:
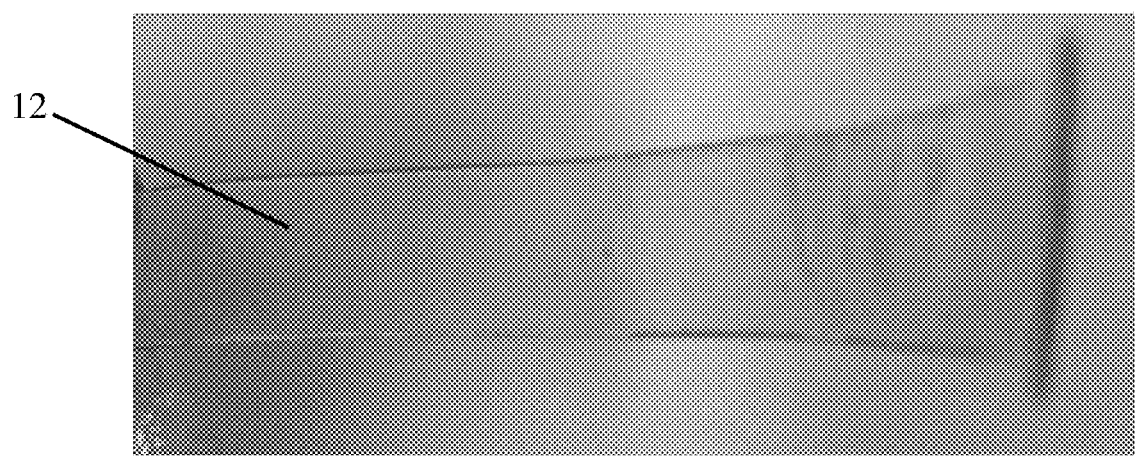
FIG. 18B is a photograph of the bonded part of FIG. 18A.

FIG. 18A is a photograph of a roll bonding system 100 and a bonded polymeric part 12 being extruded from the rollers at ambient temperature. FIG. 18B is a photograph of the bonded part.

Example: Press Bonding

Figure 19A:
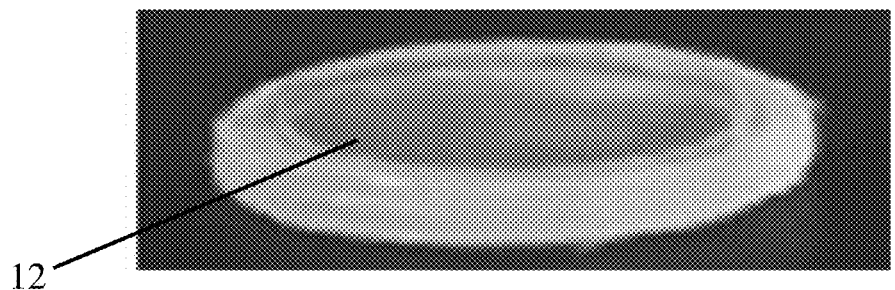
FIG. 19A is a photograph of a bonded part formed using a pressing surface arrangement.
Figure 19B:
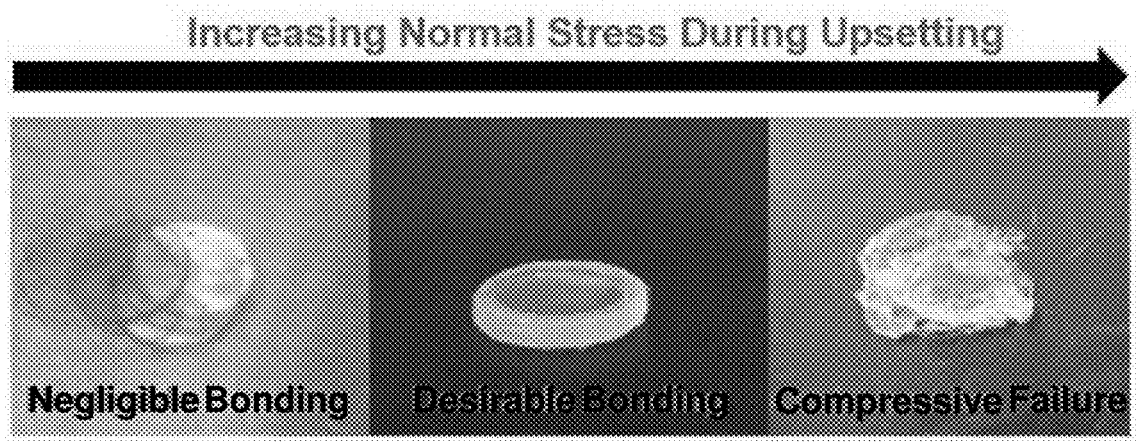
FIG. 19B depicts bonding and failure of plastic layers versus increasing stress.

FIG. 19A shows a bonded polymeric part 12 that was formed via plasticity induced bonding of several polymer layers at ambient temperature using a pressing arrangement similar to that depicted in FIGS. 3A and 3B. FIG. 19B shows bonding for multiple plastic films with increasing applied stress during plasticity induced bonding. As shown in the figure, insufficient pressure results in no bonding while excessive pressure above the ultimate strength of the part results in compressive failure.

Example: Bond Testing

Bonding experiments were carried out at ambient conditions using stacks of six film layers (each layer ~100 μm) for a total thickness of 0.6 mm. The stacks were fed through a designed roll-bonding machine to achieve active plastic deformation. As described further below, peel-tests were performed to measure the mode-I fracture toughness ($G_c$[J/m$^2$]) and lap specimens were prepared to measure shear-strength ($\sigma_s$[MPa]). $G_c$ represents the work done per unit area for debonding the interface during a peel test and $\sigma_s$ indicates the maximum shear stress sustained by the bonded interface before failure. Effective thickness reduction was used as a measure of plastic strain for these experiments.

Figures 20A, 20B:
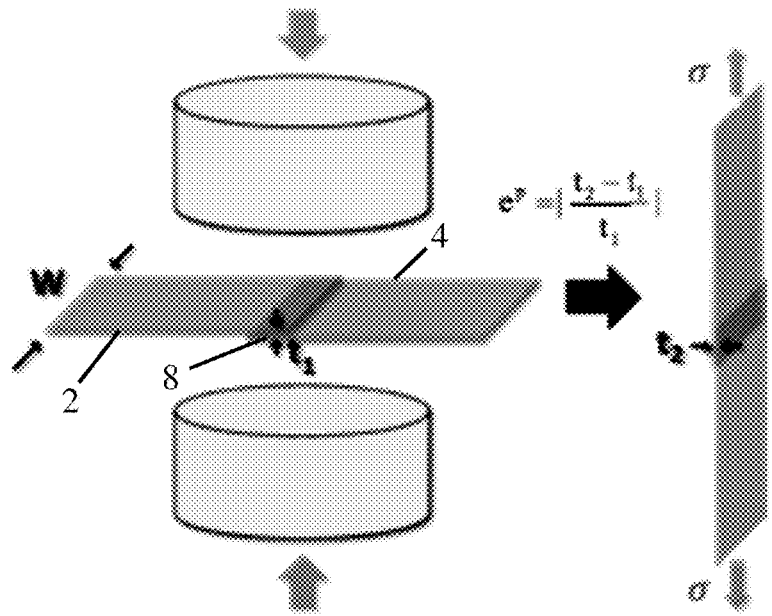
FIG. 20A is a schematic representation of a lap specimen used for horizontally oriented shear testing.
FIG. 20B is a schematic representation of a lap specimen used for vertically oriented shear testing.

FIGS. 20A and 20B, show schematic representations of a lap-specimen being bonded and subsequently used for testing the shear strength of a plasticity induced bond in a vertical arrangement respectively. Specifically, the first and second polymeric parts 2 and 4 are overlapped to form a lap joint as depicted in FIG. 20A. The overlapping portion was then bonded by a compressive load to form a plasticity induced bond across the entire overlap. The resulting specimens were then subjected to tensile loads within the planes of the thin films corresponding to the first and second polymeric parts 2 and 4. Due to the particular arrangement, the specimens when under tension apply a shear stress to the bonded interface 8 in order to measure the shear strength of the lap-joint.

Figure 21:
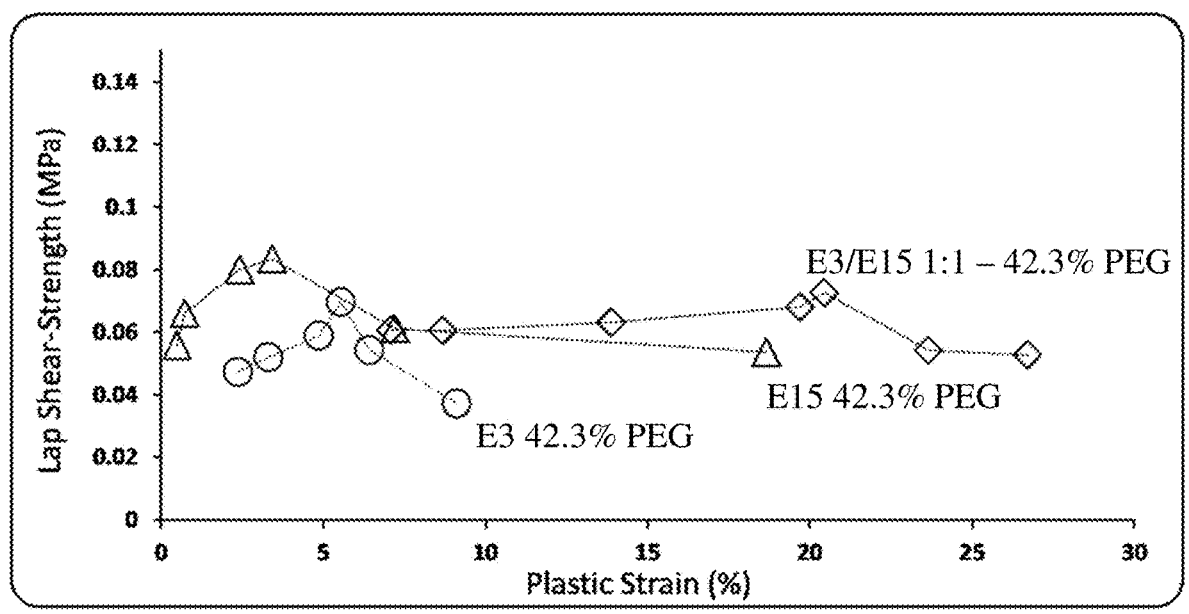
FIG. 21 is a graph of shear strength versus applied compressive strain used during plasticity-induced bonding.

FIG. 21 is a graph of shear strength versus applied compressive strain used during the plasticity induced bonding process. As illustrated in the figure, there is a correlation between the plastic-strain (in terms of thickness-reduction of lap-specimen) and shear-strength of the plastically-welded interface. Specifically, the shear strength initially increases with increasing compressive strain up to an optimal strain of about 13% to about 18%. Subsequently, the shear strength of the lap joint decreases with increasing strain. As noted previously, the specific optimal strain will likely differ depending on the particular polymeric materials being used and the processing parameters. Additionally, these are only initial test results.

Figure 22:
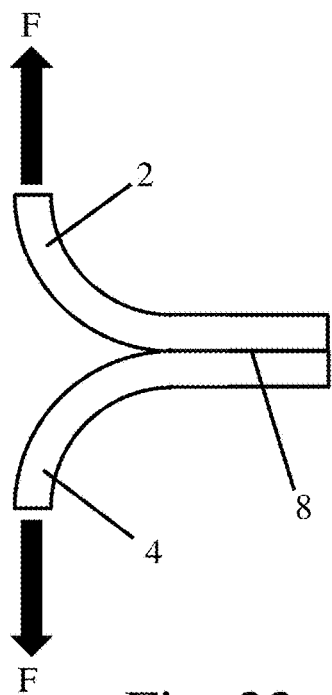
FIG. 22 is a schematic representation of a peel test.
Figure 23A:
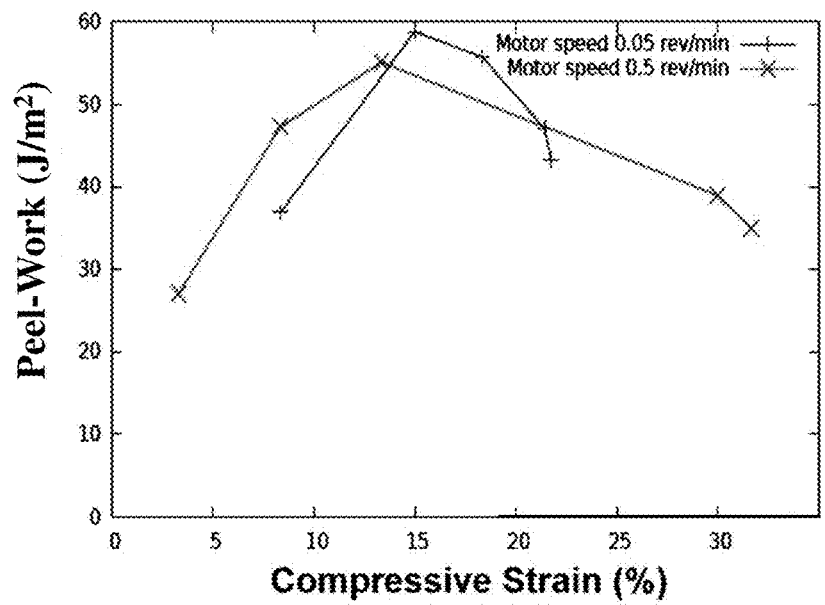
FIG. 23A is a graph of work done per unit area during advance of the crack versus applied compressive plastic-strain (i.e. thickness reduction) used during bonding.
Figure 23B:
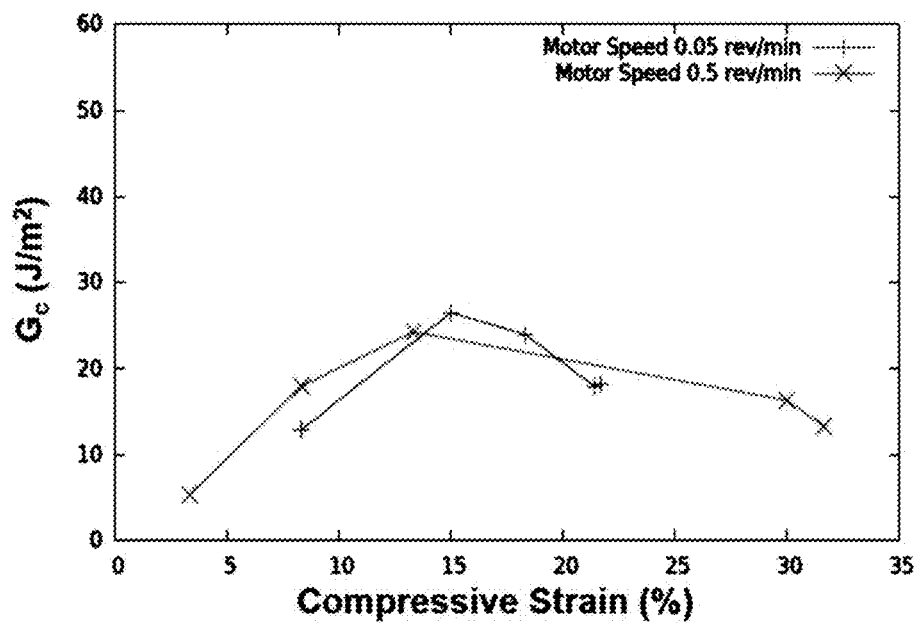
FIG. 23B is a graph of the critical-energy-release-rate versus applied compressive strain using an appropriate correction factor on FIG. 23A.

FIG. 22 presents a schematic representation of a peel testing arrangement used to measure the fracture toughness of the bonded specimens. As indicated in the figure, a bonded interface 8 located between two polymeric parts 2 and 4 has a crack introduced in it at one end using any of a variety of methods. The crack is then opened in a controlled fashion by applying opposing forces F on either side of the crack and normal to the interface. The forces and displacements applied are measured to determine the critical energy release rate $G_c$ (J/m$^2$). $G_c$ is an indication of the work done to debond the interface FIG. 23A is a graph of the experimentally measured work done per unit area during advance of the crack versus the applied compressive strain used during bonding. FIG. 23B is a graph of the measured actual $G_C$, i.e. interface work done per unit area, versus applied compressive strain used during bonding, and is corrected from FIG. 23A using a conservative correction factor to provide a lower bound for the actual interface toughness, since during the peel-test there is plastic-deformation of the peel-arm. Roll-bonding tests were conducted for a motor speed of 0.05 rev/min and 0.5 rev/min leading to a linear speed of 3.14 cm/min and 31.4 cm/min, respectively.

Similar to the results regarding the above noted shear strength testing, the fracture toughness of the plasticity induced bond initially increases with increasing total strain until an optimal strain is reached upon which the fracture toughness subsequently decreases with increasing strain. Again, the optimal strain appears to be between about 13% and 18% compressive strain according to the current test results for this particular material. In addition to the above, it appears that there is at least some strain rate dependence on where the optimal amount of strain is. Specifically, the slower motor/linear speed, and the correspondingly slower strain rate, exhibited an optimal strain that was higher than an optimal strain for the faster motor speed and strain rate.

Figure 24:
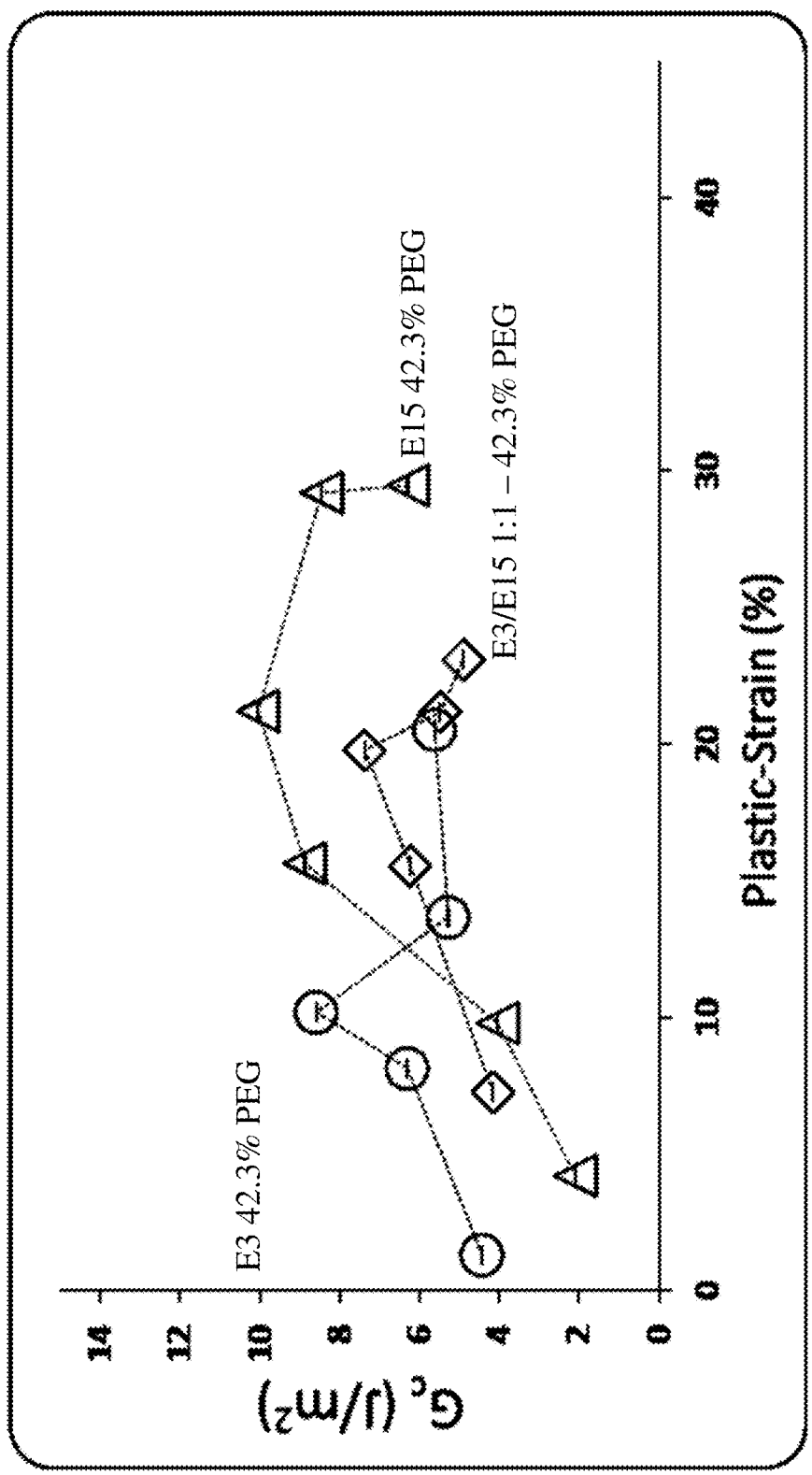
FIG. 24 is a graph of fracture toughness versus plastic strain for different combinations of HPMC E3/E15 and PEG, where the effect of gravity has been eliminated in T-peel test.

In addition to the above, $G_C$ results for three different film compositions are shown in FIG. 24. Similar to the above results, $G_C$ correlates with plastic strain in a non-monotonic fashion, first increasing and then decreasing. Without wishing to be bound by theory, it is believed that the quantitative levels of $G_C$ obtained here are attributed to the irreversible processes of chain pull-outs, disentanglement and/or scissions that occur, during debonding, and which only happen if plasticity-induced molecular mobilization and chain-interpenetration led to bonding. Therefore, the lowering of $G_C$ or $\sigma_S$ at larger levels of plastic strains could be explained by the anisotropic growth in micro-structure such that polymer chains orient in the direction of principle stretch. Such chain orientation may lead to less effective chain interpenetration across the interface which diminishes bonding at larger strains as described below with regards to FIG. 25.

Example: Interface Entanglement v. Increasing Strain

As noted above with regards to the lap shear testing and peel testing, bonding strength and toughness decreases at large compressive strengths. Without wishing to be bound by theory, this may indicate that large in plane strains may lead to reduced interpenetration of chains across the interface and thus reduced bonding strengths. This debonding process may correspond to molecular (visco-plastic) events such as chain-pullouts and chain-scissions.

FIG. 25 is a schematic representation of polymer chains within two adjacent polymeric parts 2 and 4 with an interface 8 that is subjected to increasing amounts of plastic strain during a bonding process. Initially, the individual polymer chains 6a-6d are located in their individual polymeric parts. Upon subsequent deformation, the polymer chains are mobilized and become entangled across the interface 8 as noted above in more detail. For example, the polymer chains 6a-6d have migrated across the interface and become entangled with one another. However, with increasing applied strain the polymer chains become stretched out and possibly pulled back across the interface. Consequently, above a certain amount of strain, the number of polymeric chains extending across interface and entangled with one another will decrease leading to a decreased bonding strength at larger total strains.

Example: Bonding and Fracture Surface Imaging

FIG. 26A is a scanning electron micrograph of a surface morphology of a film prior to plasticity induced bonding. FIG. 26B is a scanning electron micrograph of a surface morphology of a film after plasticity induced bonding and de-bonding. The surface imaging of the thin-films revealed the presence of micro and nano-roughness. Thus, in order to achieve conformity between the film interfaces and facilitate molecular inter-diffusion across the interface a sufficient contact pressure may be applied to the films to bring the bonding surfaces into contact.

Figures 27A, 27B, 27C:
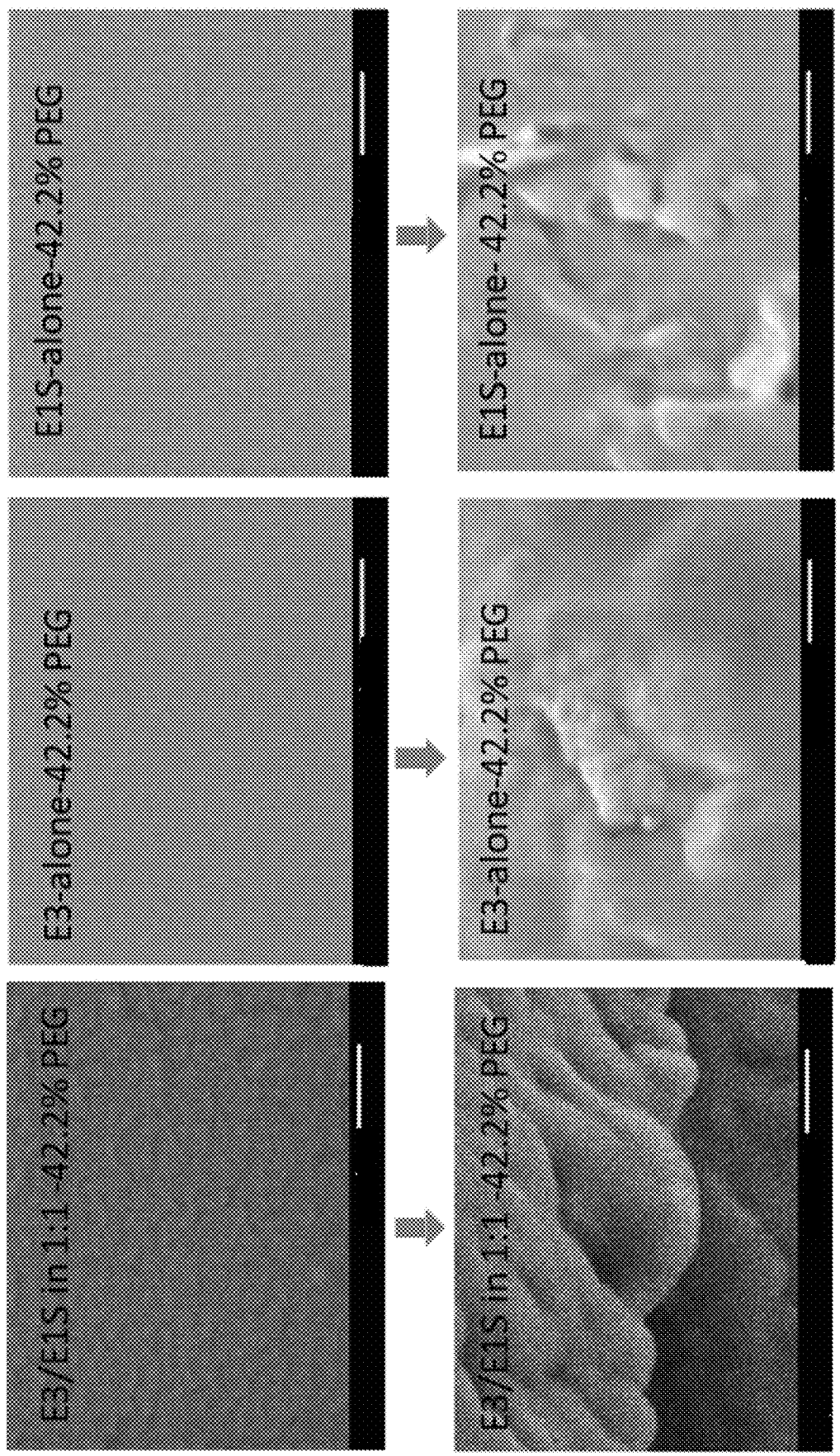
FIG. 27A-27C are comparisons of scanning electron micrograph images of film surfaces before bonding and fracture surfaces after debonding for different combinations of HPMC E3/E15 and PEG, where 5%-20% plastic strain was imposed during bonding.

FIGS. 27A-27C show comparisons of film surface morphologies before bonding and after fracture for films including E3/E15 in a ratio of 1:1 with 42.3% PEG, E3 alone with 42.3% PEG, and E15 alone with 42.3% PEG. The debonded surfaces indicate events of chain-scissions or pullouts due to fracture which are similar to the fracture surfaces reported upon fracture of polymers welded using interdiffusion.

Example: Hydrostatic Pressure

To explicitly demonstrate the role of bulk plastic deformation, a hydrostatic-die setup capable of generating large levels of hydrostatic pressure while inhibiting macroscopic plastic flow was used. The hydrostatic-Die and a typically upsetting arrangement, where two plates are displaced towards one another with the plastic films sandwiched between the plates, were carried out using an Instron testing machine. Each setup was used to compress a stack of films (E3/E15 in 1:1-42.3% PEG). Using the upsetting arrangement, the stack undergoes macroscopic plastic flow and the layers bond to form an integral structure. However, in the case of the hydrostatic-die, the layers easily splayed apart after removal illustrating that no bonding had occurred. Without wishing to be bound by theory, this indicates that plastic flow facilitates the bonding process.

EXPERIMENT

Bonding of Parts Exhibiting Elastic Characteristics

Roll-bonding of two separate films including E3/E15 in a ratio of 1:1 with 0% PEG film and E3/E15 in a ratio of 1:1 with 42.3% PEG was attempted. As noted above, the films with 0% PEG exhibited relatively negligible plastic flow characteristics as compared to the films including 42.3% PEG. The combined film stack had a thickness of 0.2 mm and was compressed by 0.6 mm. However, no bonding occurred during the rolling process. Without wishing to be bound by theory, this is believed to be due to the observed plasticity localizing in the film including 42.3% PEG, and not the other film with 0% PEG. This limiting of plasticity to one film did not promote bonding across the interface. This highlights how it may be desirable in some embodiments to induce plastic deformation in both parts during a bonding process to promote interpenetration and entanglement of polymer chains across a bonding interface. This may be accomplished by providing materials that undergo plastic deformation during at least one common range of pressures.

Example: Ethylene Glycol Diethyl Ether

Polymer films including E3/E15 in a ratio of 1:1 with 42.3% Ethylene glycol diethyl ether used as a plasticizer were produced. The films exhibited a $T_g$ of about 124° C. Roll bonding reduced the film stack thickness by nearly 50% and resulted in a plasticity induced bond. This illustrates that other plasticizers other than PEG may be used to control the plasticity of a material, and thus, facilitate the use of plasticity induced bonding.

Example: Polyvinylpyrrolidone

Polymer films made from polyvinylpyrrolidone (Kollicoat) and 10% PEG were arranged in a film stack with a thickness of 1.19 mm. The film stack was deformed to a final thickness of 0.66 mm which resulted in plasticity induced bond between the films. Plasticity induced bonding was also used to bond films made using polyvinylpyrrolidone with 20% PEG starting with an initial thickness of 1.44 mm which was deformed to a final thickness of 0.65 mm.

Example: Different Molecular Weights

Plasticity induced bonding was also used to bond polymer films having different molecular weights. Films of polyvinyl acetate (PVA) including 10% PEG were made with different molecular weight PVA's, 31 k and 146 k. A film stack made using the 31 k molecular weight PVA had an initial thickness of 0.71 mm and was deformed to 0.54 mm. A film stack made using the 31 k molecular weight PVA had an initial thickness of 0.94 mm and was deformed to 0.56 mm. In both cases, the films bonded to one another illustrating that plasticity induced bonding may be used across a range of polymer molecular weights.

Example: Roller Design Analysis

Referring again to the roller analysis presented in FIG. 11, an analysis of a rigid plastic rolling process this provided in more detail below. In this analysis, a response surface of a nondimensionalized plot of the ratio of roller radius to initial part thickness is plotted versus angular velocity and plastic-streaming time. While particular values and solutions are presented in the service, should be understood that other possible roller designs and solutions might also be used as the disclosure is not limited to any particular arrangement or configuration of the components described herein. In view of the above, the following relationships may be derived.

$$\tau = \frac{\theta}{\omega} \tag{14}$$

$$\sin(\theta) = \frac{a}{R} \tag{15}$$

$$d = \frac{a^2}{2R} \tag{16}$$

$$h_i - h_o = R\sin^2(\tau\omega) \tag{17}$$

Rearranging the above equations, the following nondimensionalized radius relationship is obtained.

$$\frac{R}{h_i} = \left(\frac{h_i - h_o}{h_i}\right)\frac{1}{\sin^2(\tau\omega)} \quad (18)$$

Figure 28:
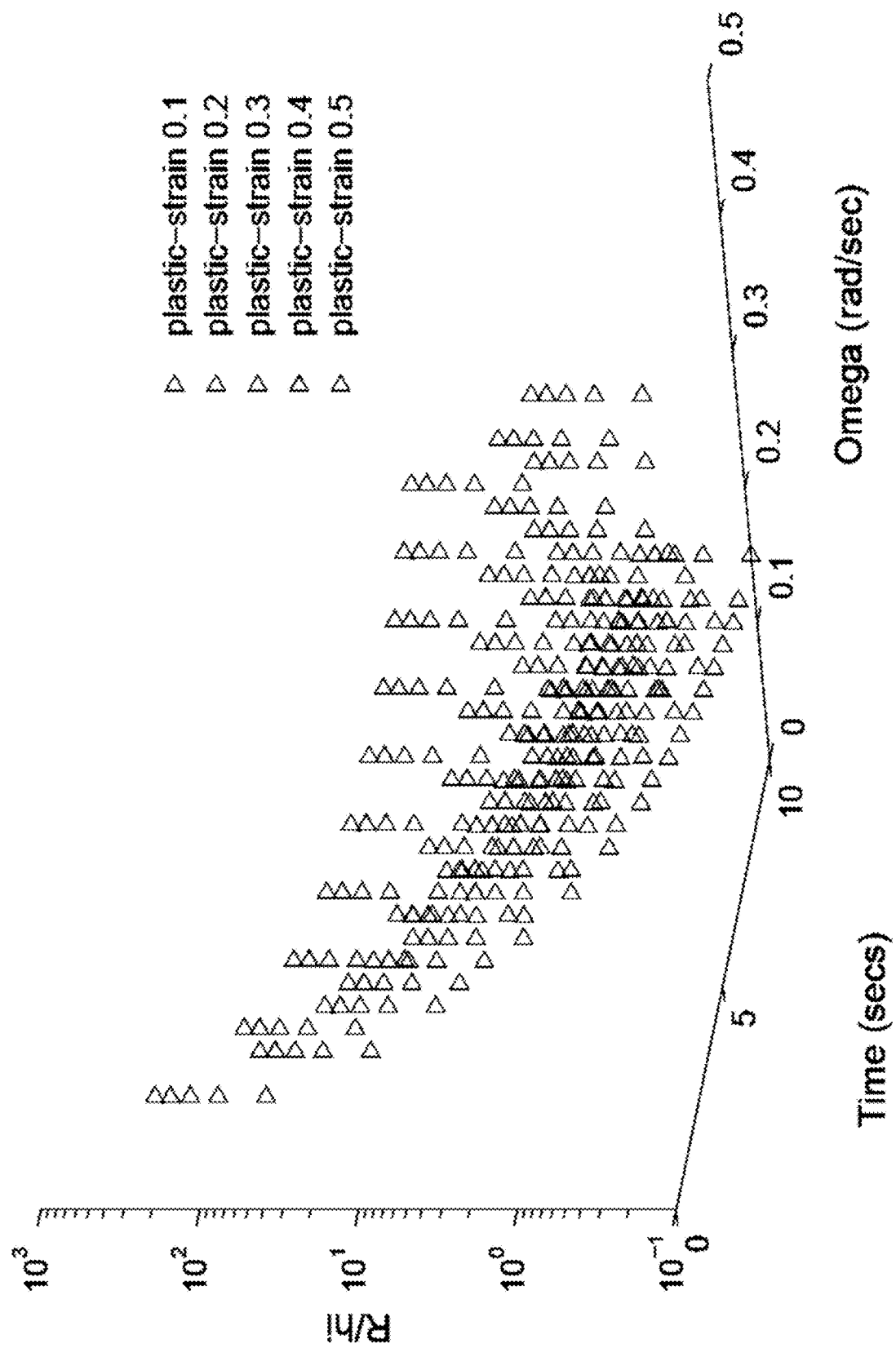
FIG. 28 depicts combinations of time, radial speed, and roller radius to provide a desired strain rate for a roller device.

Now considering a range of times between 0 and 10 seconds, and a radial velocity between 0 and 0.5 rad/sec, five different solutions to the non-dimensionalized radius are plotted for plastic strains ranging from 0.1 to 0.5. Again while several possible roller geometries are presented for the given operating factors, other geometries are also contemplated. Possible combinations of time, radial speed, and roller radius to provide a desired strain rate using the above relationship are depicted in FIG. 28.

Example: Additional Materials

In addition to HPMC and PEG based materials, proof-of-concept tests were performed on other polymeric materials to show that they are capable of bonding at ambient temperatures using plasticity induced bonding methods. Tested materials that were capable of being bonded using plasticity induced bonding at ambient temperatures included Poly(methyl methacrylate) (PMMA), Polystyrene (PS), and Polycarbonate (PC) as well as pharmaceutically compatible polymers such as polyvinyl acetate (PVA), hydroxypropylcellulose (HPC), polyvinylpyrrolidone (trade name Kollidon).

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An apparatus comprising:
   a pressing element comprising a roller, the pressing element constructed and arranged to apply a compressive force to a first part in contact with a second part in order to apply a substantially plane strain plastic deformation to the first part and the second part; and
   a controller in electrical communication with the pressing element, wherein the controller controls the pressing element to apply a compressive stress to the first part and the second part that is greater than a yield strength and less than an ultimate compressive strength of both the first part and the second part, and wherein the controller controls the pressing element to plastically deform the first part and the second part to a compressive plastic strain between about 1% and a compressive strain limit of both the first part and the second part.

2. The apparatus of claim 1, further comprising one or more sensors associated with the pressing element and in electrical communication with the controller, wherein the controller controls the applied compressive stress and/or compressive strain based on input from the one or more sensors.

3. The apparatus of claim 1, wherein one or more parameters of the roller are selected such that the roller applies the substantially plane strain plastic deformation to the first part and the second part.

4. The apparatus of claim 1, further comprising a heating element constructed and arranged to heat at least one of a bonding surface of the first part and the second part while leaving a bulk of the first part below a glass transition temperature of the first part and a bulk of the second part below a glass transition temperature of the second part.

5. The apparatus of claim 1, wherein the controller controls the compressive stress to be between about 2 and 5 times a yield strength of both the first part and the second part.

6. The apparatus of claim 3, wherein the one or more parameters of the roller comprise a radius of the roller and/or a rotational speed of the roller.

7. The apparatus of claim 6, wherein the radius of the roller and/or rotational speed of the roller are selected based on a thickness of the first and second parts.

8. An apparatus comprising:
   a pressing element constructed and arranged to apply a compressive force to a first part in contact with a second part; and
   a controller in electrical communication with the pressing element, wherein the controller controls the pressing element to apply a compressive stress to the first part and the second part that is greater than a yield strength and less than an ultimate compressive strength of both the first part and the second part, wherein the controller controls the pressing element to plastically deform the first part and the second part to a compressive plastic strain between about 1% and a compressive strain limit of both the first part and the second part, and wherein the controller controls the pressing element to maintain a temperature of the first and second parts below their respective glass transition temperatures.

9. The apparatus of claim 8, wherein the pressing element comprises a roller.

10. The apparatus of claim 9, wherein the roller is constructed and arranged to apply a compressive force to the first part in contact with the second part in order to apply a substantially plane strain plastic deformation to the first part and the second part.

11. An apparatus comprising:
    a pressing element constructed and arranged to apply a compressive force to a first part in contact with a second part;
    a controller in electrical communication with the pressing element, wherein the controller controls the pressing element to apply a compressive stress to the first part and the second part that is greater than a yield strength and less than an ultimate compressive strength of both the first part and the second part, and wherein the controller controls the pressing element to plastically deform the first part and the second part to a compressive plastic strain between about 1% and a compressive strain limit of both the first part and the second part; and
    one or more sensors associated with the pressing element and in electrical communication with the controller, wherein the controller controls the applied compressive stress based on input from the one or more sensors.

12. The apparatus of claim 11, wherein the pressing element comprises a roller.

13. The apparatus of claim 12, wherein the roller is constructed and arranged to apply a compressive force to the first part in contact with the second part in order to apply a substantially plane strain plastic deformation to the first part and the second part.

* * * * *